(12) United States Patent
Reynolds

(10) Patent No.: US 8,401,989 B2
(45) Date of Patent: Mar. 19, 2013

(54) VALIDATION MECHANISMS FOR SIMULATIONS OF COMPLEX SYSTEMS

(76) Inventor: William N. Reynolds, Albuquerque, NM (US)

( * ) Notice: Subject to any disclaimer, the term of this patent is extended or adjusted under 35 U.S.C. 154(b) by 505 days.

(21) Appl. No.: 12/705,084

(22) Filed: Feb. 12, 2010

(65) Prior Publication Data

US 2011/0231352 A1    Sep. 22, 2011

Related U.S. Application Data

(60) Provisional application No. 61/152,136, filed on Feb. 12, 2009.

(51) Int. Cl.
G06F 15/00 (2006.01)
G06F 15/18 (2006.01)

(52) U.S. Cl. ........................................................ 706/62
(58) Field of Classification Search ...................... 706/62
See application file for complete search history.

(56) References Cited

PUBLICATIONS

A. Savkin and I. Petersen, "Model Validation for Robust Control of Uncertain Systems with an Integral Quadratic Constraint", Automatica, vol. 32, No. 4, pp. 603-606, 1996.*
X. Gao et al., "Statistical Characterization of Morphological Operator Sequences", European Conference on Computer Vision 2002, pp. 590-605.*

* cited by examiner

*Primary Examiner* — Kakali Chaki
*Assistant Examiner* — Vincent Gonzales
(74) *Attorney, Agent, or Firm* — Jeffrey D. Myers; Peacock Myers, P.C.

(57) ABSTRACT

A method of and apparatus and software for validating a computer model of a complex system comprising eliciting information regarding the complex system from one or more human experts, determining from the elicited information a set of variables and a set of constraints on those variables regarding the complex system, automatically by computer examining output of the computer model to locate violations of determined constraints, and generating output establishing any located violations.

15 Claims, 9 Drawing Sheets

Technical Approach

| Hidden Program | | Leadership Mix | | | Hidden Funding | | | Overt Funding | |
|---|---|---|---|---|---|---|---|---|---|
| None | Exists | Overt Only | Both | Overt As Cover | High | Low | None | High | Low |

| | | Hidden Program | | Leadership Mix | | | Hidden Funding | | | Overt Funding | |
|---|---|---|---|---|---|---|---|---|---|---|---|
| | | None | Exists | Overt Only | Both | Overt As Cover | High | Low | None | High | Low |
| Hidden Program | None | | | | | | | | | | |
| | Exists | | A | | | | | | | | |
| Leadership Mix | Overt Only | | | | | | | | | | |
| | Both | B | | | | | | | | | |
| | Hidden | C | | | | | | | | | |
| Hidden Funding | Hi | D | | E | | | | | | | |
| | Low | F | H | G | I | | | | | | |
| | None | | | | | J | | | | | |
| Overt Funding | Hi | | | | | | | | | | |
| | Low | | | | | | | | | | |

VALIDATION MECHANISMS FOR SIMULATIONS OF COMPLEX SYSTEMS

CROSS-REFERENCE TO RELATED APPLICATIONS

This application claims priority to and the benefit of the filing of U.S. Provisional Patent Application Ser. No. 61/152,136, entitled "Validation Mechanisms for Simulations of Complex Systems", filed on Feb. 12, 2009, and the specification and claims thereof are incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. FA8750-07-C-0132 awarded by the U.S. Air Force Research Laboratory (AFRL).

INCORPORATION BY REFERENCE OF MATERIAL SUBMITTED ON A COMPACT DISC

Not applicable.

COPYRIGHTED MATERIAL

Not applicable.

BACKGROUND OF THE INVENTION

1. Field of the Invention (Technical Field)

The present invention relates to methods, software embodied on a computer-readable medium, and apparatus for validation of simulations of complex systems.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

BRIEF SUMMARY OF THE INVENTION

A method of and apparatus and software for validating a computer model of a complex system, comprising: eliciting information regarding the complex system from one or more human experts (and/or from empirical data); determining from the elicited information a set of variables and a set of constraints on those variables regarding the complex system; automatically by computer examining output of the computer model to locate violations of determined constraints; and generating output establishing any located violations. In the preferred embodiment, eliciting and determining comprise a morphological analysis of the complex system, more preferably a master equation morphological analysis of the complex system, and most preferably wherein violations of determined constraints comprise disallowed transitions between allowed states. Eliciting and determining comprise eliciting directional causal relations between variables, wherein determining comprises generating a family of testable hypotheses consisting of all possible causal graphs based on linkage information provided by the morphological analysis. Examining comprises determining if states exist that are unobserved in the output of the computer model.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 7 is a morphological analysis of the example target simulation system structure;

FIG. 8 is a morphological analysis model of the Combined Leadership-Pathway System developed employing the invention;

DETAILED DESCRIPTION OF THE INVENTION

Figure 1:
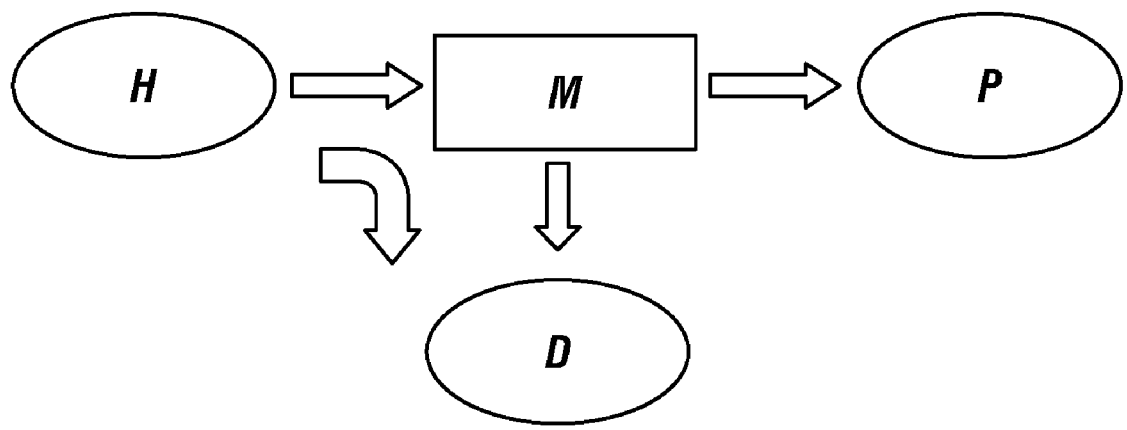
FIG. 1 is a schematic diagram of a conceptual model of "Method", as used in the present specification and claims; Method M operates on an initial hypothesis space H, yielding a set of disconfirmed hypotheses D, and a set of plausible hypotheses P.

The present invention is of a method, software embodied on a computer-readable medium, and apparatus for validation and/or verification of simulations of complex systems.

The fundamental nature of the invention is to use highly efficient, coarse grained breadth modeling techniques to structure Subject Matter Expert (SME) knowledge into simple models, which can then be triangulated (systematically compared) to high-complexity depth simulations (sophisticated computer implementations of high-resolution models) for the purpose of Validation & Verification (V&V). In general, there are two steps in V&V: Validation and Verification. Validation is determining what criteria make a model correct. Verification is the process of checking that a given model meets an established set of criteria. Colloquially, Validation is "did we build the right model?" and Verification is "did we build the model right?" In defense applications, there is often a final step, Accreditation, in which a standards organization determines and publishes the fact that a model has been properly validated and verified and is suitable for use for a particular set of applications. This full process of Validation, Verification and Accreditation is abbreviated VV&A. The specification will use the terms validation and V&V interchangeably. Many large enterprises, in particular the U.S. Government, are turning to computer simulation of complex systems. Since it is often difficult, impossible and/or immoral to conduct experiments on systems, such as economies, states, or other human social groups, there is a requirement for conducting V&V on these simulations that does not require experiment. A V&V methodology that successfully addresses these problems not only addresses existing requirements, but greatly enlarges the space of relevance and applicability of modeling and simulation of complex systems.

The specific breadth-level technique focused on is Morphological Analysis (MA) which provides a structured way to elicit expert knowledge and to enumerate the configuration space of a complex system. The elicitation provides a set of variables and a set of constraints on those variables. Variables define the state space available to a system and constraints provide a reduction in the number of configurations possible in this state space. The V&V methodology comprises surveying the output state space of a simulation and looking for states that are disallowed by the MA or for violations of constraints implied by the MA. In addition, a new technique, Master Equation Morphological Analysis (MEMA) is provided. In MEMA, expert knowledge is solicited to determine allowed dynamical transitions between allowed states. Validation is conducted by comparing to simulation and identifying disallowed transitions.

A general difficulty with MA, in any use context, is deciding on what variables (or units of analysis) one should use to describe a system; secondarily, having identified variables, it is not always clear what their states should be. In a V&V context, variables are often pre-determined by the simulation being validated; nevertheless, since a breadth-level MA model is by definition less-detailed than the simulation being validated, then some judgment must be exercised as to how the original model will be approximated by variables, and the problem of variable selection becomes extremely relevant.

A simple heuristic for generating "first-cut" MA models is to simply include a number of variables with two states: yes/no. This will typically indicate whether the variable is relevant or not—more generally, this is asking the question of whether a variable should be included in the model or not. This approach can be useful for identifying interacting sets of "submodels" in the original problem.

For example, for a cultural modeling problem, a fundamental question is which cultural group, or player, to include in an analysis. For example, consider a conflict in a fictional city, Cocainia. Candidate players include the Military, the Cartel A, Cartel B and a paramilitary group. A simple heuristic for starting MA models is to simply assign yes/no as states to a variables. Doing this one gets the following MA table.

TABLE 1

MA Table Illustrating the Yes/No Technique

|  |  | Military | | Cartel A | | Cartel B | | Para Military | |
| --- | --- | --- | --- | --- | --- | --- | --- | --- | --- |
|  |  | Yes | No | Yes | No | Yes | No | Yes | No |
| Military | Yes | ■ | ■ | | | | | | |
|  | No | ■ | ■ | | | | | | |
| Cartel A | Yes | | | ■ | ■ | | | | |
|  | No | | | ■ | ■ | | | | |
| Cartel B | Yes | | | | | ■ | ■ | | |
|  | No | | | | | ■ | ■ | | |
| Para Military | Yes | | | | | | | ■ | ■ |
|  | No | | | | | | | ■ | ■ |

Conducting an analysis, one sees that there is not significant coupling between the variables—i.e., there is no reason to think that we should not include Military if Cartel A or B is present. The model is not illuminating.

One addresses this by considering the key intelligence question (KIQ), which is to understand the conflict in Cocainia. The hypothesis is that this is being driven by competition over trafficking resources. Players with overlapping trafficking capabilities (e.g., ability to ship narcotics over the border) are likely to compete; those with disparate capabilities won't compete (and may even cooperate if their capabilities are complementary). A simple model of this process considers whether two agents have a given capability and whether they conflict or cooperate.

TABLE 2

MA Table Illustrating 3-Body Problem

|  |  | Agent X Capability | | Agent Y Capability | | X-Y Interaction | | |
| --- | --- | --- | --- | --- | --- | --- | --- | --- |
|  |  | No | Yes | No | Yes | Conflict | None | Cooperation |
| Agent X Capability | No | ■ | ■ | | | | | |
|  | Yes | ■ | ■ | | | | | |
| Agent Y Capability | No | | | ■ | ■ | | | |
|  | Yes | | | ■ | ■ | | | |
| X-Y Interaction | Conflict | | ▨ | | | ■ | ■ | ■ |
|  | None | | | | | ■ | ■ | ■ |
|  | Cooperation | | | | | ■ | ■ | ■ |

The problem with this model is that it does not map nicely onto the MA paradigm. If one considers the red cell in the figure above, one is asking whether there will be conflict if agent X has the capability—reasoning argues that this also depends on whether agent Y has the capability. This is a "three-body" constraint, which is not useful in the MA framework, which seeks "two-body" constraints.

The specification next expands on this point. A given cell in the MA table represents the condition that two variables are in particular states. MA can be viewed as a series of IF-THEN statements, where the IF part of the statement represents the conditionals implied by the location of the cell, and the THEN part of the statements represent whether that configuration is allowed or disallowed. For example, the cell Agent X Capability: Yes/Agent Y Capability: No represents the conditional (in pseudo code):

---
If 'Agent X Capability' == 'yes' AND 'Agent Y Capability' == 'no' THEN
    either ALLOW (empty cell) or DISALLOW ('X' in cell)
---

In Table 2, the condition associated with the red cell can be expressed as

---
If 'Agent X Capability' == 'yes' AND 'X-Y Interaction' == 'Conflict' THEN
    (ALLOW or DISALLOW)
---

But the actual knowledge we would like to encode involves 3 variables:

---
If 'Agent X Capability' == 'yes' AND 'X-Y Interaction' == 'Conflict' AND 'Agent Y Capability' == 'yes' THEN
    (ALLOW or DISALLOW)
---

MA uses the spatial location in the table to represent the conditionals—since each cell is an intersection between the states of two variables, constraints that involve 3 (or more) variables, such as the example above, do not map onto the paradigm. This is referred to as the Three Body problem.

The traditional approach to solving this problem is to simply allow states that have additional constraints, and then examine the full states space manually, allowing the expert to consider multiple variable constraints and disallow particular states. Said in another way, compute all 2×2×3=12 of the allowed states from Table 2 above, and then consider each state separately, eliminating those states that are deemed as disallowed because 3 or more of the variables are in mutually incompatible states. A problem with this approach is that the number of states can be large, and the cognitive effort with considering multiple states of multiple variables is very large and leads to an increased likelihood of mistakes. It was precisely to mitigate this effort, and reduce the likelihood of error, that MA was developed for in the first place.

A general approach for addressing the Three Body problem is to move the complexity from the constraints to the variable space. In our conflict example, this leads to the following MA model:

TABLE 3

MA Table Illustrating the Variable Composition Technique

|  |  | Agent X-Y Capability |  |  |  | X-Y Interaction |  |  |
|---|---|---|---|---|---|---|---|---|
|  |  | No-No | No-Yes | Yes-No | Yes-Yes | Conflict | None | Cooperation |
| Agent X-Y Capability | No-No |  |  |  |  |  |  |  |
|  | No-Yes |  |  |  |  |  |  |  |
|  | Yes-No |  |  |  |  |  |  |  |
|  | Yes-Yes |  |  |  |  |  |  |  |
| X-Y Interaction | Conflict | X | X | X |  |  |  |  |
|  | None |  |  |  | X |  |  |  |
|  | Cooperation | X |  |  | X |  |  |  |

The above has aggregated two variables, 'Agent X Capability' and 'Agent Y capability' into on variable—'Agent X-Y' Capability. The original two variables each had two states, leading to a total of four configurations. The new aggregated variable also has four configurations, corresponding to the configurations of the original two variables. By doing this, cells in the table associated with the aggregated variable now encode an extra condition. For example, the cell marked in red in Table 3 can be represented by the conditional:

---
IF 'X-Y Interaction' == 'Conflict' AND ('Agent X Capability' == 'Yes' AND 'Agent Y Capability = 'Yes') THEN
    ALLOW Configuration
---

In this model, one uses an extended state space that captures the variation of capabilities. By doing this, each cell represents the states of multiple variables.

In general, aggregating multiple variables will likely lead to highly complex MA models. The next step is to triage this problem into smaller submodels, as next discussed.

Another approach to the "three-body" problem mentioned above is to sequentially build models, using lower-complexity models as a basis for higher complexity models. This is an explicit example of the "breadth-depth" methodology of the invention. In this case, one considers aggregated variables as "sub-models", and one uses MA to reduce the configuration space of the sub-model, and then uses the reduced state space as the states in an aggregated variable.

To make the approach explicit, consider the Agent capability sub-model extracted from Table 2.

TABLE 4

Example of Model Triage for Complexity Reduction

|  |  | Agent X Capability | | Agent Y Capability | |
| --- | --- | --- | --- | --- | --- |
|  |  | no | yes | no | yes |
| Agent X Capability | no | | | | |
|  | yes | | | | |
| Agent Y Capability | no | X | | | |
|  | yes | | | | |

In this example, one has eliminated the possibility that neither agent has the capability (work is getting done, so it must be one of the players being considered). The allowed states for this model are:

TABLE 5

Allowed States for Sub-Model from Table 4

|  | Agent X Capability | Agent Y Capability |
| --- | --- | --- |
| 1 | no | yes |
| 2 | yes | no |
| 3 | yes | yes |

One sees that the submodel has only 3 states instead of 4. One can now aggregate this into a single variable, Agent X-Y Capability, which can be used in more complex models. For example, using this original version of Agent X-Y Capability in the MA model given in Table 3 there are 12 configurations; using the aggregated version of Agent X-Y Capability generated by the sub-model in Table 4 leads to a model with 9 states, a reduction in complexity of the model by 25%.

Naturally, the constraints of and causal inferences generated in both submodels and aggregated models can be used in the V&V process.

Model triage is a powerful paradigm for organizing SME knowledge and can provide an optimal investment in analytic resources.

The invention also provides a novel extension to MA based on causal inference theory (CIT). CIT with MA provides a systematic way to elicit causal realtions from Subject Matter Experts. Understanding causality is essential for informing policy. For example, statistically, the water level in a river is correlated to the snowpack in the mountains. Statistical reasoning does not give one any information on how one influences the other—only that the are correlated. From a policy perspective, this is extremely problematic, if one only understands correlation and not the causal relations, a naïve policy reccommendation would be to influence snowpack by changing the river's water level.

MA is readily extended with CIT. CIT implies that when MA disallows a particular state combination, the two variables involved must be causally related (since fixing the disallowed value of one will influence the distribution of the other). Unfortunately, this linkage does not provide the causal direction. Nevertheless, SME's can often provide information on the direction of causality between two variables; furthermore, one can generate family of testable hypotheses consisting of all possible causal graphs based on linkage information provided by the MA. Variables that are causally independent can only be those which do not have constraints in the block linking them (although such an absence does not imply independence). This family of graphs can then be evaluated by SMEs or tested against evidence. This approach can provide novel insights on the underlying causal mechanisms in a system—these insights become an essential foundation for policy recommendation.

From a V&V perspective, consider that one has a complex simulation that incorporates river level and snowpack. An elementary MA shows that they are causally related, as show in Table 6. One disallows the variable combination snowpack=low with river level=hi, since the river cannot be high without sufficient snowpack (we do not disallow snowpack=hi with river level=low since in cold weather, the river level can be low even with large snowpack). The X in the block between river level and snowpack implies the two variables are causally related. One does not know a priori which influences which; however, further interaction with a SME indicates that river level is causally dependent on snowpack. This implies that one can perform an experiment on the simulation—one can vary the simulation variables that correspond to snowpack and one should see variation (formally, a change in the distribution) in the simulation variables that correspond to river level. Conversely, if one varies the simulation river level one should see no change in the simulated distribution of snowpack. This provides a testable assertion that can be formally tested in simulation. Falsifications imply that either the expert reasoning captured by the MA or the simulation is incorrect.

TABLE 6

Simple MA of River-Snowpack Interaction

|  |  | River Level | | Snowpack | |
| --- | --- | --- | --- | --- | --- |
|  |  | low | hi | low | hi |
| River Level | low | | | | |
|  | hi | | | | |
| Snowpack | low | | X | | |
|  | hi | | | | |

In the event that no causal direction is established, one can still test for a causal relationship between variables. In this case, an X in a block between variables implies that there is a causal relationship, although one cannot say which way it points. For this case, one simply performs both experiments—varying on variable and checking for changes in the distribution of the other and vice versa. The existence of a causal relationship implies that one should see a variation in distribution in at least one of the experiments. The absence of such variation would constitute of falsification and lead again to a validation check.

Finally, a SME may determine that two variables are causally connected, with or without specifying a causal dependency, without specifying a morphological constraint. Such an assertion could be tested in a validation experiment as described above.

An important point is that all of tests described that compare the results of the MA to the results of simulation could just as easily be applied to real world evidence. The comments made at the beginning still apply, as it is often impractical to conduct experiments on real-world systems. Nevertheless, there often exists large amount of empirical data bearing on a real world system, and if it doesn't exist, it is often possible to collect such data. Each of the tests described, such as testing against a morphological constraint or testing a causal relation, could be used to test against real-world evidence, if the data exists. Any of these tests would have the potential to falsify both models and cause their underlying reasoning to be reconsidered.

Accordingly, the present invention provides an approach for supporting validation and verification (V&V) for complex modeling and simulation. It employs a means of characterizing methods, Breadth-Depth, which encompasses techniques ranging from simulation to unstructured human judgment. Based on this framework, a cost-effective method for V&V of complex systems simulation is triangulation of simulation against breadth methods. It is preferred to employ a specific instantiation of this approach, based on morphological analysis (MA).

This specification next discusses a particular implementation of the invention.

Social scientists and modelers have long recognized that theories about complex social systems are difficult to validate. Addressing this problem, they have observed that traditional scientific method is fundamentally about making a comparison—comparing a theoretical description of a system to an experimental, measurement-based description of a system. Social scientists generalize this approach as triangulation, a term meaning that different descriptions of a system are compared to one another. Mismatches between descriptions imply that one is incorrect and highlight areas for further study. Triangulation techniques based on the combination of multiple methods to enhance reasoning are examples of multimethod.

In an important form of triangulation—face validation—simulation results are triangulated against the judgment of subject matter experts (SMEs). This approach has several advantages. First, it ensures that results are intuitively acceptable to users. Second, human judgment is exquisitely agile and can be applied with relatively low cost. Moreover, humans are very good at inventing novel tests to push simulations in ways not envisioned by their designers. Despite its potential benefits, however, face validation has a poor track record. Simulations can generate intuitively reasonable results for the wrong reasons, or produce reasonable results that are only valid in the small regions of output space sampled by the SMEs during validation.

Before proceeding, it is necessary to define some terms. A method is an axiomatic procedure, such as a simulation or an algorithm, for generating knowledge from other knowledge. A multimethod is a construction of two or more methods. Methodology is a collection of procedures using method to arrive at an operational goal, such as the selection of a course of action. Multimethodology is a methodology that employs multimethod.

Formally, the specification describes a method as taking an initial space of explanations (hypotheses), applying evidence to it, and producing a reduced space of explanations. This model is depicted in FIG. 1. Applying the method reduces uncertainty, but there is a cost in time and resources. For example, mathematical addition starts with two numbers and an initial uncertainty of the entire number line. The user incurs some cost in terms of time by applying an addition algorithm to eliminate every point on the number line but one: the correct answer. The user may wish to triangulate this result, at additional cost, by repeating the calculation. In mathematics, methods often have the desirable property of reducing uncertainty spaces to a single answer. In the analysis of real world problems, a partial reduction of uncertainty is often the best one can hope for.

Figure 2:
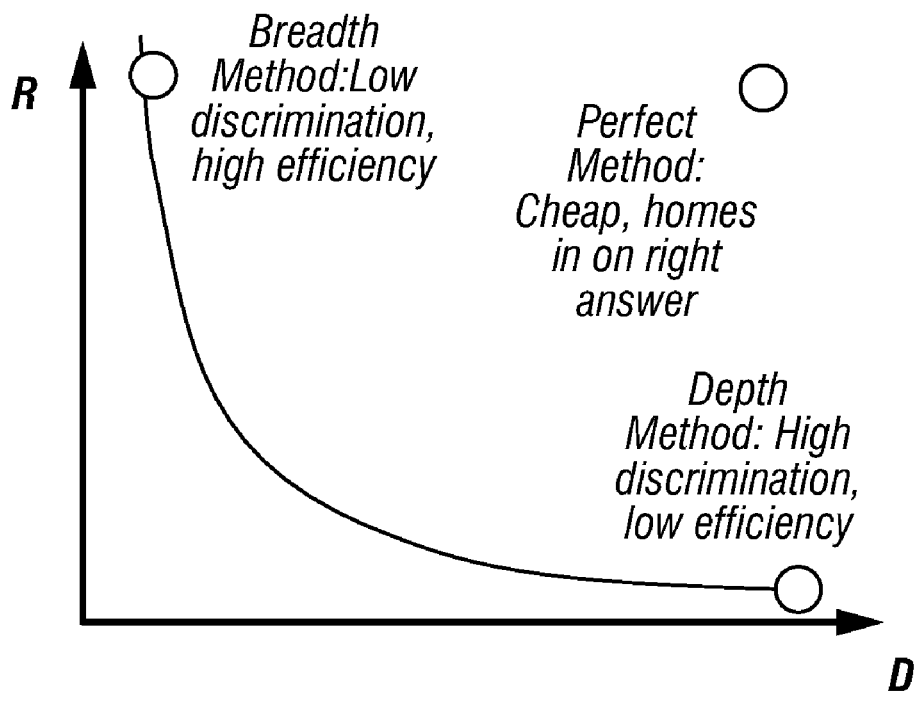
FIG. 2 is graph illustrating the tradeoff between Discrimination, D, and Efficiency, R.

This model of method provides a framework for understanding triangulation. The specification now introduces two quantities that describe method: Discrimination, $D$, is the fraction of initial hypotheses disconfirmed by a method (it is the ratio of the set sizes $|D|/|H|$). Efficiency, $R$, is the amount of resources consumed by a method for each hypothesis considered. In general, there is a tradeoff between efficiency and discrimination. Qualitatively speaking, effort and the number of disconfirmations will both increase as more data is introduced. Data-intensive depth methods have high-discrimination and low efficiency. Breadth methods that do not include large amounts of explicit data, such as unstructured human judgment or the widely-known analysis of competing hypotheses (ACH), can efficiently cover large hypotheses spaces with low discrimination. The application illustrates this tradeoff in FIG. 2.

For a given amount of available resources, one would like to reduce as much uncertainty as possible while minimizing the effort and likelihood of error. In breadth-depth terms, face validation triangulates a high-efficiency breadth method (unstructured human judgment) against a low-efficiency depth method (the simulation being validated). This approach is appealing because of the high efficiency of expert judgment. However, it is well-known that unstructured expert judgment has a very high error rate that will limit the accuracy of methods based upon it, even when triangulation is used. One conjectures that using structured breadth methods can produce better method discrimination and error rates than unstructured judgment—thus improving the triangulation—is supported by evidence. However, one must try to keep the methods within the range of efficiency supplied by breadth techniques, since it can be argued that efficiency plummets with model complexity. Thus, the breadth-depth metrics guide development of efficient and effective validation approaches.

For example, the idea of comparing simulations for validation purposes is not a new one—"model docking" is one example where two high-complexity depth simulations are compared to one another for validation purposes. See, e.g. Axtell, Robert, Axelrod, Robert, Epstein, Joshua M. and Cohen, Michael D., "Aligning Simulation Models: A Case Study and Results", Computational and Mathematical Organizational Theory, 1 (1996), pp. 123-141. The present invention considers the requisite costs of the efforts—for example, one uses simulation instead of experiment because of cost, and one uses face validation instead of model docking because of cost. The present invention focuses on characterizing and enhancing the return on investment of low-cost validation approaches such as face validation.

A simple example will make these concepts more concrete. A breadth decision model of the U.S. Senate might consist of two types of agents, Republican and Democrat. An SME could easily populate such a model, since there are only two agents. The price for this efficiency is that the model can only provide very high-level insights. Fine-grained explanations—such as which senators might vote for which bills—are beyond its capabilities. A depth decision model might consist of 100 agents, one representing each senator. Such a model, if valid, could provide very detailed insights into voting and coalition profiles. However, correctly specifying the model's causal mechanisms and input data—and interpreting its output—presents an immensely greater challenge than the two-agent breadth model. Despite their vast differences in scope, both models should make the same predictions for similar inputs. The coarse-grained preference of Republicans in the two-agent model should match the aggregate preference of Republicans in the 100-agent model. This idea of matching across different scales is well-established in other fields: Bohr's correspondence principle in physics and boundary-layer theory in differential equations are two examples.

The most effective use of resources is initially to use breadth methods and then pursue hypotheses that survive breadth disconfirmation with depth methods. This conclusion runs counter to the trend in most fields of complex simulation, where the application of depth approaches is increasing. The silver lining in this argument is that if one has an existing depth approach it can be validated relatively cheaply by triangulation against breadth methods. Providing a breadth-level triangulation of a complex model has a further advantage: it provides a "cognitive interface" to the model that is accessible to end-users of the system. This facilitates model development as well, by providing a medium through which customers and technical experts can discuss their requirements and difficulties.

Figure 3:
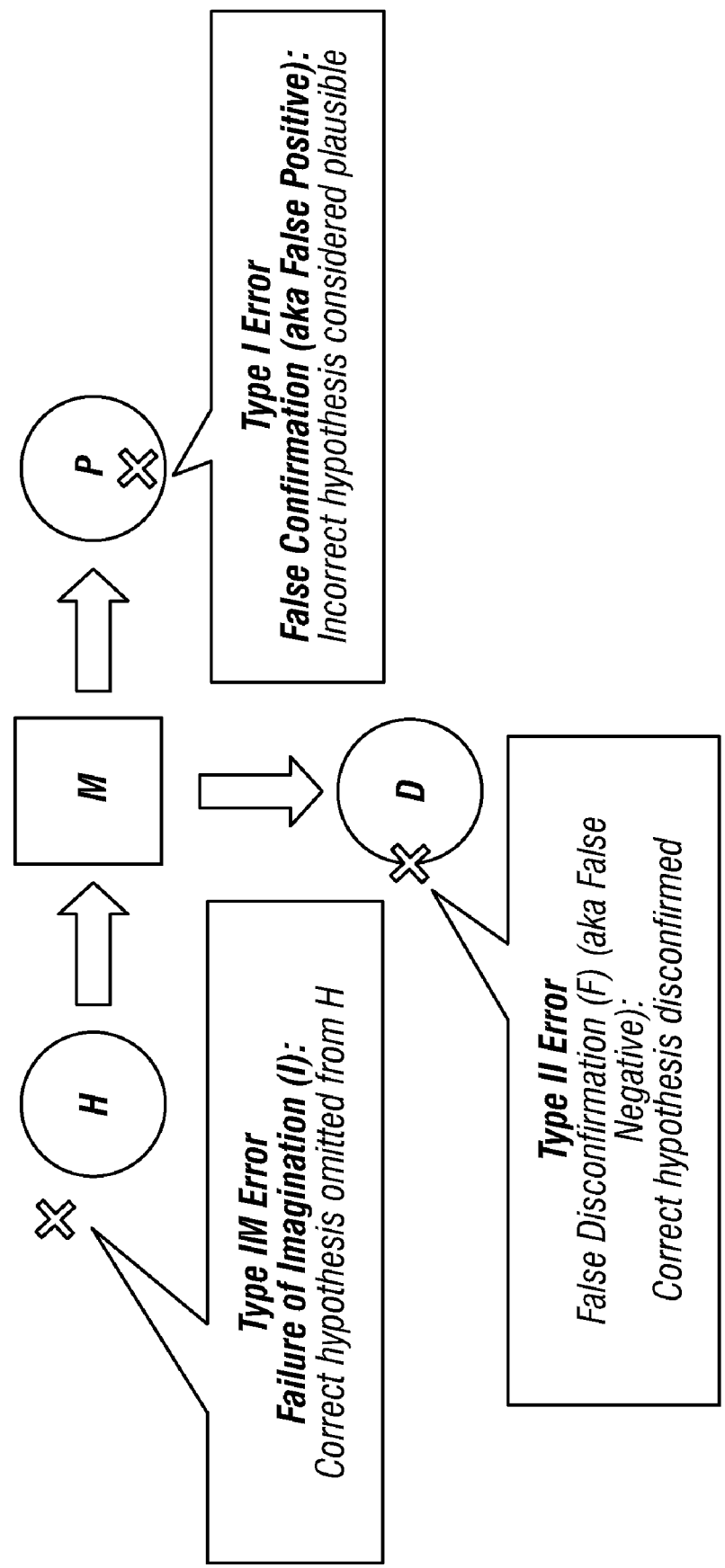
FIG. 3 is a schematic diagram showing the types of errors in Method.

The specification has mentioned error rates, but now it is time to explain how to use the inventive methodological framework to analyze their impact on triangulation. In FIG. 3, errors are depicted in the context of the inventive methodological framework. One represents each error as a red X in the diagram. Two of the errors, false positive (Type I) and false negative (Type II), are well known in the statistics literature. Note that the framework of the inventive method, which operates in a disconfirmatory mode, assumes that Type I errors are an inevitable and natural part of the reasoning process; for this reason, the term "plausible" is applied to the set of allowed hypotheses after application of method. Also introduced is a new type of error—failure of imagination or a Type IM Error—which occurs when the correct explanation is not in the hypothesis space of the reasoning method. It is believed that fear of this error is one of the factors driving simulations of complex systems to greater and greater complexity.

Figure 4:
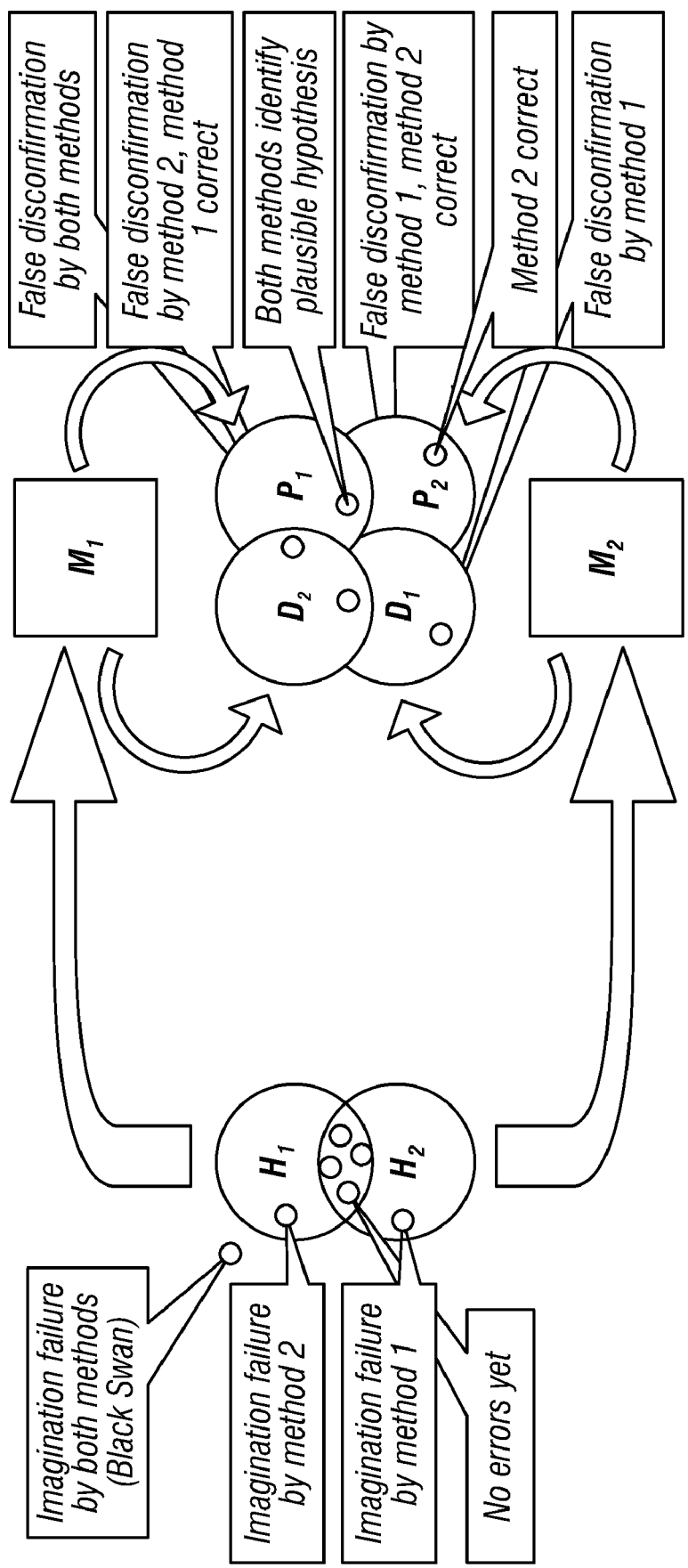
FIG. 4 is a schematic diagram showing the types of possible errors in a Triangulation Multimethod.

FIG. 4 features triangulation in action using this framework. The dots represent the many different potential starting and ending points for a valid hypothesis. There are a number of cases to consider. A valid hypothesis can be omitted due to an imagination failure by one or both methods, or it can be falsely confirmed or disconfirmed by one or both methods. Associated with each method, we have probabilities for each error: $P_I$, $P_{II}$ and $P_{IM}$. One usually cannot measure these quantities, nor are they likely to remain invariant across problems. Also note that these quantities are distinct from a method's discrimination and efficiency. One can have a "perfect" high-efficiency, high-discrimination method with a very high error rate.

Table 6 lists the error rates of the triangulated multimethod in terms of the error rates of the constituent methods. For example, the probability that triangulation will have an overall Type IM error is represented by $P^{MM}_{IM} = P^1_{IM} \cdot P^2_{IM}$, where $P^1_{IM}$ and $P^2_{IM}$ are the imagination error rates of the constituent methods. (This assumes no correlation in the error rates. Correlated error rates mitigate the error reduction of triangulation, but can only eliminate it in the case of complete correlation, which is to say applying the same method twice adds no confidence to an analysis.) The important thing to notice about this expression is that the error rate of a triangulation will be lower than the error rate of an individual method—both methods have to simultaneously overlook a hypothesis for an imagination failure to occur in the triangulation. Further, the triangulation will flag the majority of errors containing mismatches. For example, one method will find a hypothesis to be plausible, while another will disconfirm it. The triangulation cannot say which method is in error, only that there is an inconsistency. Reconciling these errors must be accomplished by further triangulation against experimental data or other methods.

The errors listed in Table 7 are undetectable by triangulation when the same type of error occurs in both methods. These "fatal" errors will be less common in triangulation, since many of the failure modes will be mismatches. By contrast, all errors in a single method will be "fatal." Obviously, one can extend this reasoning to accommodate triangulation by more than two methods, in which case the corresponding "fatal" error rates will drop. Of course, if all constituent methods in a triangulation have a high error rate, then the error rate of the triangulation will also be high (although reduced).

Although triangulation is applicable to both validation and verification, the principal focus of this effort will be triangulation for validation. Validation is the process of determining whether the model correctly represents ground truth. The problem with simulations of complex systems is that it is often difficult to say what "ground truth" actually is. Systematic triangulation provides us with a pathway for developing quantitative, auditable, and adaptive statements of what we believe ground truth to be. The general procedure is to triangulate multiple methodological captures of information against each other and then systematically identify and reconcile mismatches. Mismatches will themselves be reconciled by triangulating against other representations of the information, such as more in-depth expert knowledge, more in-depth study of the target simulation, or even entirely different models or knowledge captures from other SMEs. Having a knowledge capture methodology, such as morphological analysis, whose depth can easily be "tuned" in response to new validation requirements (e.g., mismatches), is a necessary capability for this process.

Through iterations of this process, one produces a breadth representation of SME knowledge and evidence. The goal is that the complexity of this breadth representation will be high enough to capture and reconcile all mismatches identified during the validation phase, but low enough to remain efficient and comprehensible to the SMEs who populated it and to the technical simulation experts. This breadth representation will then become the benchmark against which simulations are verified.

An obvious risk of using this approach has already been alluded to. There will be times when both the depth simulation and the breadth knowledge capture will be wrong, and wrong in the same way. One way to mitigate this is to use multiple knowledge captures, either at different levels of depth, and/or produced by different SMEs. Nevertheless, there are good arguments for believing that errors will persist, especially failures of imagination. Although one cannot eliminate these errors, an adaptive validation methodology will allow one to capture them as they occur, re-validate the simulations, and generate new verification benchmarks.

TABLE 7

Error Rate of Triangulated Multimethod

Probability of imagination failure by both methods: $P^{MM}_{IM} = P^1_{IM} \cdot P^2_{IM}$
Probability of false negative by both methods: $P^{MM}_{II} = P^1_{II} \cdot P^2_{II}$
Probability of false positive by both methods: $P^{MM}_{I} = P^1_{I} \cdot P^2_{I}$ A problem with the current breadth-depth framework is that one does not have a good, general way to characterize hypothesis spaces, and hence determine the efficiency and discrimination of a given method. That said, paraphrasing Supreme Court Justice Potter Stewart's definition of obscenity, one knows breadth and depth when one see it. Further, a class of analytic methods does exist that readily allows the complexity of hypothesis spaces to be estimated.

The technique of morphological analysis (MA) is the most well known method in this class. Developed by astronomer Fritz Zwicky in the middle of the last century, MA uses SME knowledge to segment a problem into conceptual variables, enumerate the possible states, and prune the outcome space. The method centers on identifying "driver" variables and their states. For each configuration of the variables, a scenario is identified and its plausibility assessed. For large numbers of variables and states, the number of scenarios becomes huge. (This is not unrealistic—the combinatorial explosion of possibilities is one of the key factors that make analysis of complex systems and forecasting so difficult). In other contexts, information technology has been used to help mitigate this problem.

Like almost all breadth methods, MA is focused on structuring the knowledge of an expert. The art in this approach is choosing driver variables and enumerating their states, which become the underlying assumptions of the analysis. A variable is a conceptual segmentation that is used to understand a problem and provide an ontology for experts to reason about the problem. In this context, a variable may be considered a unit of analysis. In MA, variables are further segmented into states. For example, in a model of the U.S. Senate's decision making, a possible variable is ideology. This is an explicit assumption about an analytical unit of the Senate's decision space. A segmentation of this variable into states would, at the least, consist of the states conservative, libertarian and liberal. More refined segmentation might be appropriate, depending on the needs of the analytical context. Variable states are chosen because they are mutually exclusive; for example, the variable states of ideology can only be conservative, libertarian, or liberal, each of which excludes the other.

After segmentation, all configurations of the system are a priori allowable. This leads to an exponential explosion in the number of allowed configurations. If, for example, one has n variables with m states, then there are $n^m$ configurations. This quantity explodes very quickly—3 variables with 5 states each will have $3^5=243$ configurations—and experts can often generate tens or even hundreds of variables for describing states. Zwicky notes that although the number of configurations grows exponentially with the number of variables, the number of pairs of states only grows quadratically. By systematically considering pairs of states and eliminating disallowed combinations, the space of allowed configurations can be significantly reduced. This allows one to use expert knowledge to effectively prune the configuration space (which is a metric of the system's complexity) down to sizes that are cognitively accessible. This reduction in complexity is the essence of the process of analysis and is made explicit by the MA approach.

As a final step, the surviving states can be assessed by experts. Sometimes higher order constraints will disallow particular states. As an example, variable ideology being libertarian is consistent with variable policy being low-regulation, which is an observation on a pair of variable states. Other variable states can moderate these pairwise relationships; for example, if variable society stability is violent unrest, then state libertarian is no longer consistent with state low-regulation. Ideally, one would examine all higher order constraints, although the effort of doing so becomes unmanageable for SMEs unless the model is very efficient. This is another argument in favor of high-efficiency, low-complexity approaches for validation.

Having generated a set of constraints and disallowed states, the MA can be used to validate a complex simulation by means of the following procedure:

(1) A mapping has to be generated from the MA to the simulation. Typically, this means that the qualitative variables and states developed during the MA will have to be associated with parameter ranges in the target simulation. Often, imagination failures in either the MA or the simulation will become obvious and have to be addressed as part of this step. These sorts of errors will often necessitate consultation with customers to help understand the intended use and the scope of the simulation.

(2) The set of disallowed states produced by the MA is then compared to data captured from runs of the target simulation. In each of these runs, the state of the simulation is measured and mapped onto the MA states, and the simulation state is checked against the list of disallowed states. Any observations of the simulation in a disallowed configuration will trigger a validation check. This will cause both the MA and the simulation to be examined in more depth to determine which (or possibly both) formulations are incorrect. Errors in simulation will be addressed by the simulation team. In the event the MA is in error, the MA will be reconstructed, most likely at greater depth, and the SME knowledge capture conducted again. The process will then be iterated until no mismatches are observed between MA and simulation.

(3) Another step, which in principle is the same as step 2, is to validate against the explicit pair constraints instead of the full list of states. This would include other higher order constraints—such as 3-state constraints and specific disallowed states—and should lead to identical results as validating against the full state list. Nevertheless, this step should provide an extra layer of confidence in the validation effort and help trap procedural errors in the validation process, especially for complex models and large MAs.

(4) Finally, the focus has been on mismatches by attempting to observe hypotheses disconfirmed by the MA in the output of the simulation. One would also like to check the inverse situation by asking if there are unobserved states in simulation that are deemed plausible by the MA. Determining the answer will require a histogram in which observed simulation states and the allowed set of MA states are plotted. Those states that do not occur are possible mismatches, although it will remain a challenge to distinguish rare from disallowed occurrences. An analogous procedure can be conducted for step 3—bin out observed pair correlations from simulation against the allowed pair correlations from the MA. Again, heuristics must be employed to distinguish rare from disallowed pairs.

So far, the specification has described MA of static problems, i.e. expert knowledge is captured in the form of "state A is disallowed in the presence of state B." One can also conduct MA of dynamic phenomena, a procedure very similar to master equation approaches from condensed matter physics. This method, developed by LSS, is called Master Equation Morphological Analysis (MEMA). Having identified states of a system using MA, One specifies which transitions between states are disallowed, exactly as one does in MA. One can then validate the simulation's dynamics against this capture of expert knowledge using the static case procedure described above. A disadvantage of MEMA is that specifying dynamic information is significantly more work than specifying static information. The number of allowed transitions of a system with N configurations scales as $N^2$, so only low-complexity MAs can use this technique. The results of the proof-of-concept of breadth-depth validation conducted by LSS were promising: of the four MEMA-derived breadth predictions (out of 86) that were tested against a depth simulation, three were in agreement with the simulation. The fourth case led to a mismatch that was identified as an error in the full simulation.

A particularized implementation of the invention is next described.

Software according to the invention applies the analytical multi-methodology of the invention. This approach combines breadth—a broad survey of the possibility space—with depth—detailed analyses of areas of interest—to produce a breadth-depth multi-methodological analysis of the problem space.

The example target simulation was a large complex system integrating modeling technologies and subject matter expertise from at least five different performers. The example target simulation was focused on a group of decision-makers directing the two coupled manufacturing efforts, the first effort being an overt dual-use effort, the second being a covert effort. The first task became to understand the central thrust of the example target simulation and to implement a breadth-level model. Follow-on tasks required using the model to realize some of the claims made of breadth-depth, namely to use it as a "road-map" to help guide customers and modelers in the use of the model and to triangulate results across the breadth model and the depth model (the full example target simulation).

After some consideration, morphological analysis (MA) was selected as the modeling methodology to use for the project. There were several reasons for this—the first was that LSS had a fairly good high-level understanding of the goals of the project, having provided a leadership decision module to an earlier version of the example target simulation; consequently, extreme breadth mechanisms such as structured brainstorming and concept mapping were deemed unnecessary. Further, such methods would have been more difficult to explicitly triangulate against the extremely quantitative example target simulation. Finally, the present invention provides a new variant of morphological analysis. The morphological analysis approach analyzes the transition behavior between morphological states, similar to the approach taken with master equations in condensed matter physics, and is called the modified approach master equation morphological analysis (MEMA). Master equation morphological analysis is an appropriate technique for supporting the example target simulation, since the latter was fundamentally concerned with transition behavior.

In the course of analysis, two morphological analysis models were constructed for the example target simulation. The first was a model of the various features of the production pathway. This model revealed deficiencies in reasoning about the role of leadership on pathway behavior, in particular how leadership probes might affect pathway performance. Based on these insights, a second model, focused on the interaction between leadership and pathways, was constructed. This model was a better "fit" to the example target simulation system concept of probes, and served as a basis for a master equation morphological analysis model.

The first method used was to generate hypotheses about the relationship between information and political stability using morphological analysis, a structured, breadth-first method developed in the 1950's by astronomer Fritz Zwicky. The method centers on identifying "driver" variables and their states. For each configuration of the variables, a scenario is identified and its plausibility assessed. For large numbers of variables and states, the number of scenarios becomes huge. (This is not unrealistic—the combinatorial explosion of possibilities is one of the key factors that make analysis of complex systems and forecasting so difficult). In other contexts, information technology has been used to help mitigate this problem. Since the present application was interested only in a coarse-grained survey of the possibility space, the specification will confine itself to a small number of low-complexity drivers.

Like almost all breadth methods, morphological analysis is focused on structuring expert knowledge. Information is solicited from the expert and structured by the morphological analysis framework. The art in this approach includes choosing independent driver variables and enumerating their states—these become the underlying assumptions of the analysis. In this context a variable may be considered a unit of analysis, a conceptual segmentation that is used to understand the problem and provides an ontology for experts to reason about the problem. In morphological analysis, variables are further segmented into states. For example, in the example target simulation one possible variable is Overt Pathway Funding. This variable isolates a particular aspect of the example target simulation problem—bearing on resources allocated to the overt segment of the pathway being considered by the example target simulation—into a convenient analytical unit. A segmentation of this variable into states would at the least consist of the states LOW and HIGH. More refined segmentation might be appropriate depending on the needs of the analytical context. Variable states are chosen to be mutually exclusive: for example, the variable Overt Pathway Funding can only be in the LOW or HIGH state—one excludes the other.

After this segmentation, one initially accepts all configurations of the system as being a priori allowable. This leads to a combinatorial explosion in the number of allowed configurations. If, for example, we have n variables, each with $m_n$ allowable states, then the total number of possible configurations, $C_T$, is given by:

$$C_T = \prod_{i=1}^{n} m_i$$

If each variable has the same number of allowable states, this reduces to, $C_T = M^n$.

This quantity explodes very quickly—e.g., 5 variables with 3 states each will have $3^5=243$ configurations. Experts can often generate tens or even hundreds of variables for describing states. Zwicky's trick is to note that although there are combinatorial numbers of configurations, if one considers pairs of states, there are only polynomial numbers. For example, for n variables, each with $m_n$ allowable states, the number of pair-wise combinations, $C_P$, becomes:

$$C_P = \sum_{i=0}^{n-1} m_i \sum_{j=i+1}^{n} m_j$$

If there are no allowable states (n=0), then $m_0$ necessarily is one ($m_0$=1), and for n=1, $C_P$=m).

If each variable has the same number of allowable states, this reduces to, $$C_P = m^2 \sum_{i=1}^{n-1} i, \text{ for } n \geq 2. \text{ (Again, for } n = 1, \quad C = m.\text{)}$$

By systematically considering pairs of states and eliminating disallowed combinations, the space of allowed configurations can be reduced. This allows one to use expert knowledge to effectively prune the configuration space (which is a metric of the system's complexity) down to sizes that are cognitively accessible. This reduction in complexity is the essence of the process of analysis.

Having segmented the problem into variables and states, morphological analysis allows a systematic, pair-wise evaluation of each variable state to each of the others (across variables). State combinations are assessed by the expert to be either allowable or unallowable. For example, if we were to assign to the variable Hidden Pathway Funding the states NONE, LOW, and HIGH, and assign to the variable Hidden Program Exists the states NONE and EXISTS, an expert would judge that the Hidden Pathway Funding (NONE) was inconsistent, and hence disallowed with the state Hidden Program Exists (EXISTS). After identifying all such constraints, the allowed configurations of the system are enumerated. This is readily accomplished in virtually any programming language. For the example target simulation, a simple morphological analysis algorithm was implemented using the scripting language Python.

The morphological approach is based on the general approach of enumeration and filtering, both of which are features of a number of other breadth methods, including Landscape coalition analysis, quadrant crunching, and Bayesian analysis.

Morphological analysis provides an explicit enumeration of the possibility space available to the system. This information is analytically valuable for a number of reasons. One is that it provides an explicit test of the experts' assumptions, in the form of variables, states, and constraints, against evidence, in the form of observed configurations of the system. Second, it provides a means for analyzing the dynamics by limiting possible trajectories to a discrete symbol set. This latter observation leads to the master equation morphological analysis approach.

Morphological analysis is an innovative and important technique for organizing and operationalizing expert knowledge about a complex system; however, it is a static technique with no implicit dynamics. This is important for the example target simulation problem, since the dynamical response of the system to operational probes is central to the example target simulation's vision.

To address this problem, the invention provides the master equation morphological analysis approach, which is reminiscent of the idea of the master equation (ME) from condensed matter physics. While the implementation of ME can be technically quite sophisticated, the basic approach is straightforward. In essence, it first assumes that one can enumerate all possible states of a system. The dynamics are then described in terms of transitions from one state to another and the description of the system's dynamics is now expressed as a series of symbols representing its possible configurations. The master equation is a differential equation specifying the dynamics over this symbol space the system must obey. A similar approach from dynamical system theory is symbolic dynamics.

As a breadth method intended to illuminate coarse-grained behavior, master equation morphological analysis is not nearly as sophisticated as ME or symbolic dynamics. Very much in the spirit of morphological analysis, master equation morphological analysis is focused on determining what transitions between states are allowed without regard for the rates or intervals at which transitions occur. This means the mapping of a given set of symbols to the time axis could be highly non-linear. Some transitions may occur on one timescale—for instance, months—while others could take minutes. Despite this shortcoming, the enumeration of possible transitions can be an extremely useful analytic tool for evaluating the example target simulation system's reasoning.

A further subtlety in master equation morphological analysis is that we may have additional variables which describe the context of a transition—for example the state of an organization's budget (increasing or decreasing) may impact the transitions allowed in the funding variables in the systems state space—transitions from LOW to HIGH are disallowed in a context within which budgets are decreasing. One can again use morphological analysis to enumerate the possible contextual transition states. At this point, the decision whether to identify an analytical unit to be part of the system or the transition context is still in the "art" form. For the example target simulation problem, this segregation was fairly straightforward.

Figure 5:
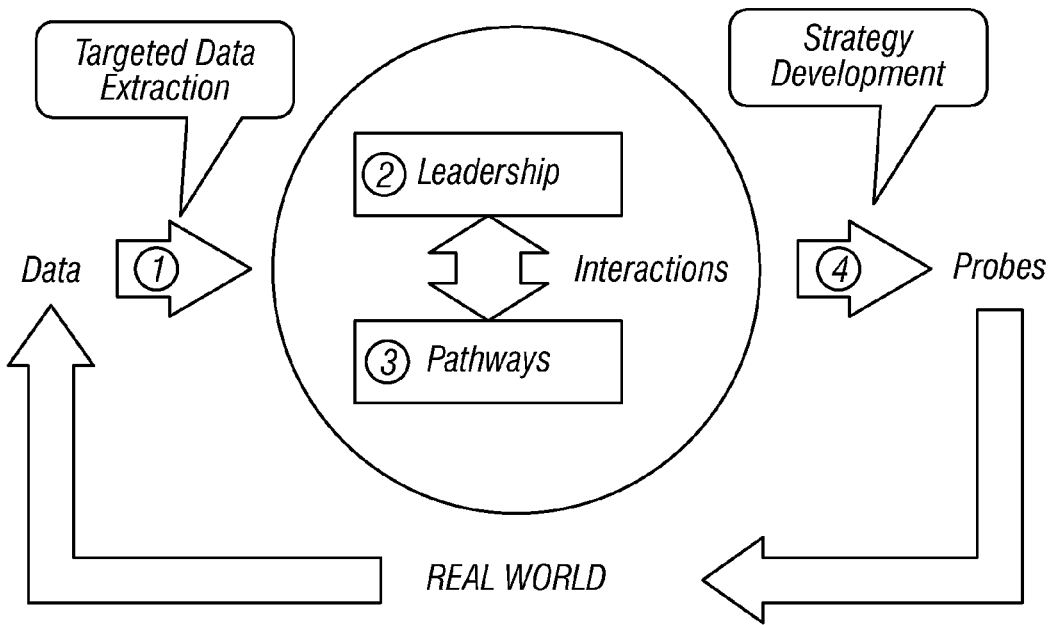
FIG. 5 is a schematic diagram of the example target simulation system process, software, and apparatus of the invention.

The basic example target simulation is shown in FIG. 5. The example target simulation models real-world processes as pathways (possible physical processes leading to the accomplishment of an end) that are instituted, affected, or terminated by leadership decisions. By modeling processes of interest in the real world, one can infer how the real world might react to various stimuli ("probes"), and thus infer what sort of stimuli might or might not be effective in eliciting required or desired information. The example target simulation system ingests data from the real world (①) and uses that data to update the leadership (②) and pathway (③) models. The system then proposes stimuli ("probes") that might be used in order to elicit information or to affect outcomes in the real world. Once the probe or probes are tried, the system gathers information on the real-world responses, uses that information to update the models, and the cycle begins anew.

Figure 6:
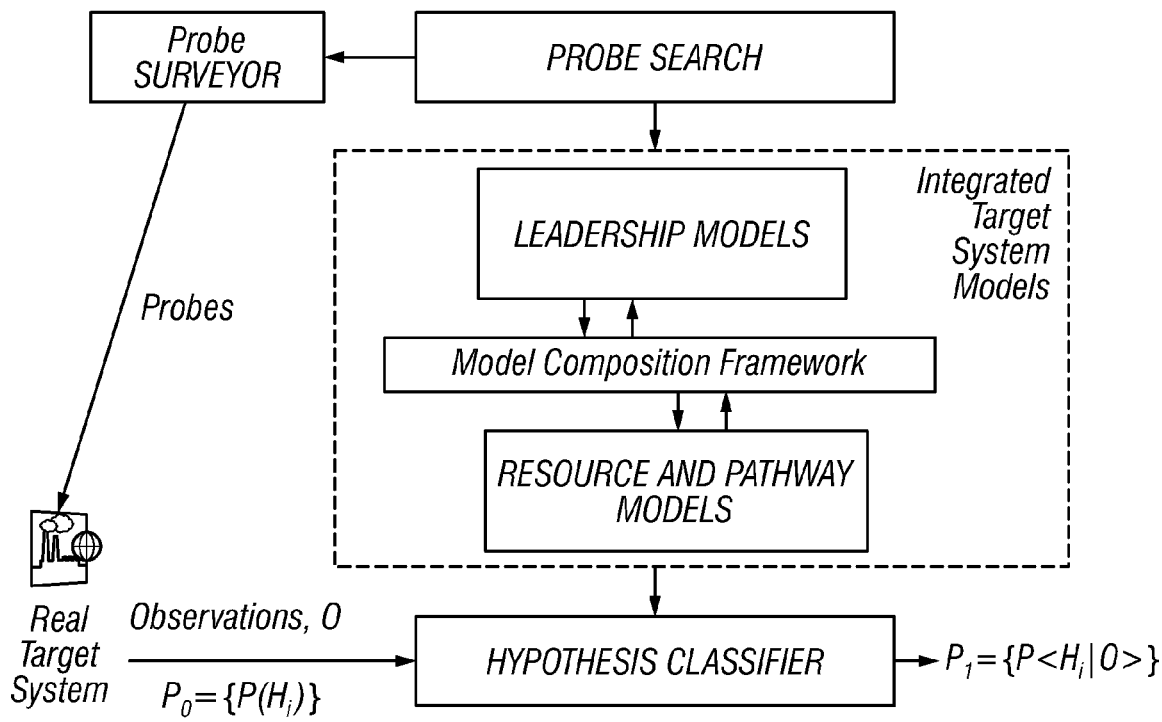
FIG. 6 is a schematic diagram of the example target simulation system technical approach, process, software, and apparatus of the invention.

The example target simulation problem is focused on an industrial process. Some parts of this process are overt and others are hidden. The challenge is to infer, through observation of the overt processes, the state of hidden processes which may or may not exist. One is allowed to operationally probe the system to help reveal the hidden state. Probes may include influencing factors on the pathway, or manufacturing side of the process, or influencing decisions about the processes' leadership. A schematic of the technical approach used in the example target simulation system is shown in FIG. 6.

The example target simulation system uses a sophisticated set of software modules integrated into a unified software backplane to model the various components of the external system being analyzed. Other software modules systematically optimize the system in search of plausible probes. The sophistication of the combined system is enormous, having on the order of $10^3$ conceptual variables. Using the system involves a number of steps. It must be populated with information, which is identified and harvested by experts either from their knowledge or from available sources. Operating parameters and uncertainty regimes must be identified, the system must be executed, the results tabulated and analyzed, conclusions must be drawn, and results, along with their underlying justifications, disseminated to operational customers. Because of the prohibitively large number of variables involved and the time required to explore all possibilities fully, the example target simulation system is an ideal candidate for bounding the investigative space by using breadth-level modeling.

To begin the analysis of the example target simulation, subject matter experts (SMEs) working on the problem were engaged. The morphological analysis approach was described and he problem structure was discussed. After a number of discussions, the subject matter experts identified the following set of variables in Table 8 that describe the example target simulation.

TABLE 8

Example Target Simulation System Initial Variables
Example Target Simulation System Variables - Initial

| VARIABLE | STATES | DESCRIPTION |
|---|---|---|
| Hidden Program | NONE EXISTS | This variable represented whether the organization had a hidden program, with a hidden production R&D pathway. |
| Human Resources | FEW MANY | This variable represents the overall level of human resources consumed across both programs |
| Specialist PhDs | FEW MANY | This variable captures the number of Ph.D.-level domain experts consumed across both programs. |
| Resources | LOW HIGH | This variable represents the level of resources, principally financial, consumed over both programs. |
| Power Consumption | LOW HIGH | This variable represents the level of power consumed across both programs. |
| Facility Size | SMALL LARGE | This variable represents the size of the facility necessary to house the programs. |
| Investment Balance | OUTSIDE-HEAVY MIXED INSIDE-HEAVY | This variable represents the sources of investment in the organization's activities. It is provided because the more outside sources of funding that are utilized, the more difficult it is to maintain secrecy of a covert program. |

The underlying assumption for this system was that there are a number of programs being conducted in the same facility. This implies that there will be a number of resource factors consumed by one or both programs. The state space of this model of the hidden program allows 2*2*2*2*2*2*3=192 possible configurations. One now constructs a table juxtaposing the variable states against themselves and identify pair-wise constraints. States containing these disallowed pairs will themselves be disallowed. In this way one will reduce the complexity of the model.

Figure 7:
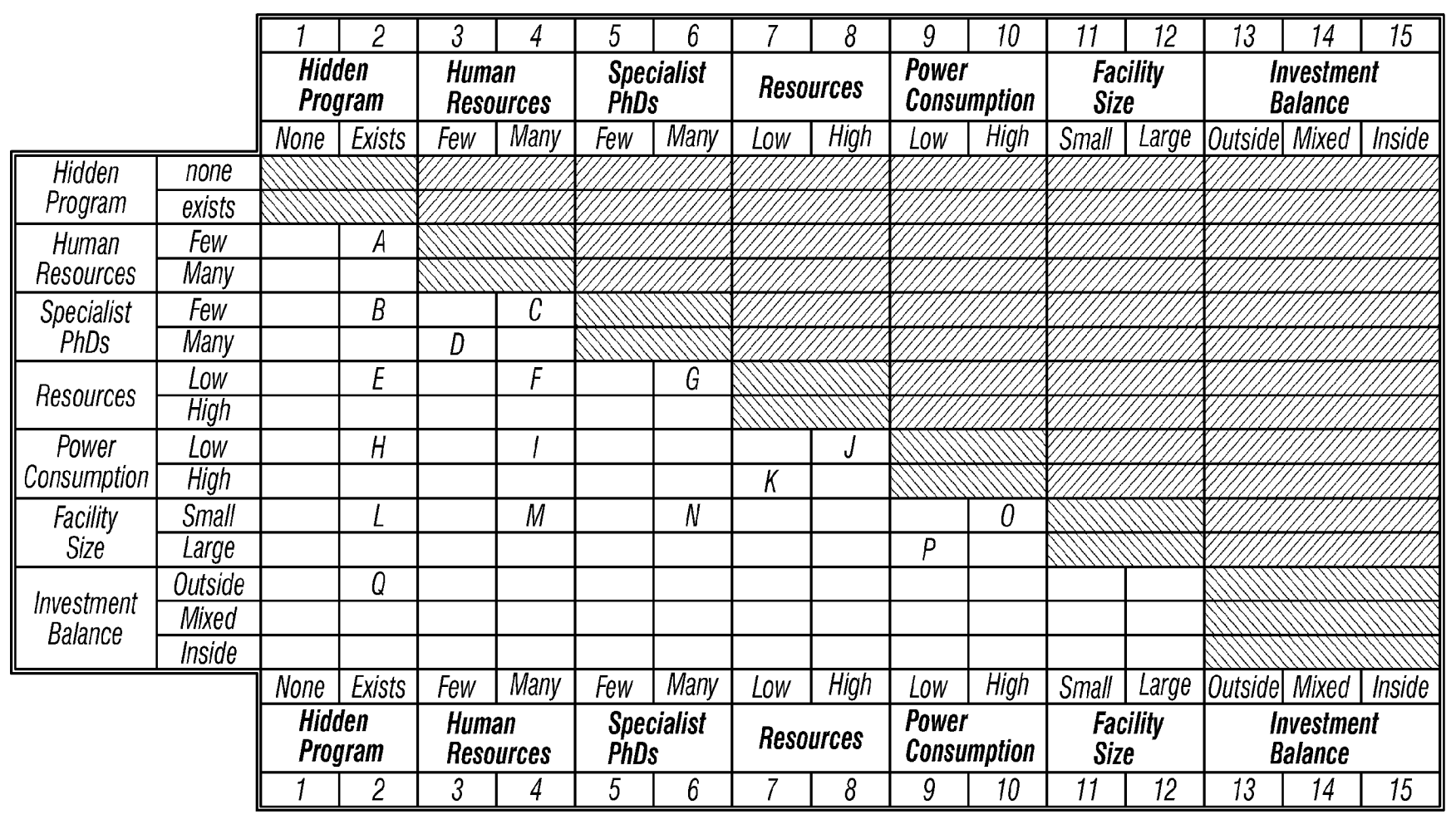

In FIG. 7, a morphological analysis table is provided. Each cell in the lower triangle of this matrix represents a pair of states a detailed analysis with the subject matter experts on the necessary constraints. Examining the 90 possible pairs, one identified 17 cases where there were constraints between the variable states. One enumerates these constraints with letter codes that correspond to letters in the table in FIG. 7.

Some of the constraints are marked with an asterisk. While conducting the analysis, it was realized that the model did not account for dynamic realities of the situation. For example, during startup of a program, a hidden program could exist, but power consumption would be low. Similarly, if a program were idled, under some circumstances resources or personnel could be shifted to another program. Similarly, because it is likely that multiple programs would not be synchronized in their requirements, it might be possible that some human resources could first be used on one program and then on another. These are the sorts of dynamic issues which bedevil an inherently static analysis.

By applying such constraints to the 192 possible configurations of the original system, 11 feasible states were identified. These are shown in Table 9.

TABLE 9

Allowed States of Initial Morphological Analysis of the Example Target Simulation System
Example Target Simulation Initial Allowed States

| | Variable | | | | | | |
|---|---|---|---|---|---|---|---|
| State | Hidden Program | HR | PhDs | Resources | Power | Facility | Investment Balance |
| 1 | None | Low | Low | Low | Low | Small | Internal |
| 2 | None | Low | Low | Low | Low | Small | Mixed |
| 3 | None | Low | Low | Low | Low | Small | External |
| 4 | None | Low | Low | High | High | Large | Internal |
| 5 | None | Low | Low | High | High | Large | Mixed |
| 6 | None | Low | Low | High | High | Large | External |
| 7 | None | High | High | High | High | Large | Internal |
| 8 | None | High | High | High | High | Large | Mixed |
| 9 | None | High | High | High | High | Large | External |
| 10 | Exists | High | High | High | High | Large | Internal |
| 11 | Exists | High | High | High | High | Large | Mixed |

Analytically, this provided some interesting observations. First, of the 17 constraints listed in FIG. 7, nine were unambiguous (there is no asterisk denoting a caveat). These constraints provide a very useful validation criterion for the example simulation system. Using the full example target simulation system, the morphological analysis implies that none of the disallowed combination of states should be allowed. For example, the full example target simulation should never exhibit configurations in which a hidden program is accompanied by a small facility. As will be seen, this validation strategy was tested using an analysis based on the master equation morphological analysis approach.

Another observation was that, of the eleven allowed states, only two had hidden activity. This implied that many of the variables were not particularly useful in answering the analytic question as to whether or not there was a hidden program. Further discussion revealed that it was not clear which of these aspects would be observable. Thus there were a large number of possible observation scenarios to be considered (i.e., the morphological field of different configurations of hidden and observable). Finally, it was not obvious how to conduct probes against a number of these variables; for example, facility size is not a variable that is easily modified through (non-destructive) external probing.

The conclusion at the end of this modeling exercise was that this formulation of the model was both too deep and too broad. A central aspect of the example target simulation vision, namely the interaction between the state of the leadership and the allocation of resources between different pathways, was poorly captured by the model, therefore the model lacked depth. On the other hand, details of the interactions between the pathways were overrepresented in the model, thus its breadth was not sufficient. For this reason, a second model was undertaken to try and understand the details of the leadership-pathway interaction.

Based on analysis of the initial pathway-centric morphological analysis model of the example target simulation, which revealed a deficiency in the treatment of the interaction between leadership and levels of effort on the pathways, a second model was constructed that focused on these aspects. Since the pathway effects were deemed to be too fine-grained (i.e., at too much depth) in the initial model, a more coarse-grained (i.e., greater breadth) representation was used in the second model. This model comprised four variables representing leadership and the two classes of pathway, hidden and overt. See Table 10.

TABLE 10

Example Target Simulation System Variables - Revised
Example Target Simulation System Variables - Revised

| VARIABLE | STATES | DESCRIPTION |
|---|---|---|
| Hidden Program | NONE EXISTS | This variable represented whether the organization had a hidden program, with a hidden production R&D pathway. |
| Overt Program Funding | LOW HIGH | This variable gives a coarse-grained representation of the overall level of funding for overt activities. A key assumption of the model was that the organization was overtly organized to conduct such activities and would expend some level of effort on these activities in all cases. |
| Hidden Program Funding | NONE LOW HIGH | This variable gives a coarse grained representation of the overall level of funding for covert activities. Since this activity may or may not exist, an additional funding state was included to represent the possibility of no covert activities. An assumption of the model is that both overt and covert activities involve similar levels of effort and incur costs on the same order of magnitude, thus a change in level of effort on one pathway frees up or obligates funds that could be used in the other. |
| Leadership Mix | OVERT MIXED HIDDEN | This variable represents the preference of the organization's leadership towards the covert program. In all cases, the leadership will support the overt program, if only, in some cases, to provide a "cover story" for the overt program. The overt state represents a leadership preference towards overt programs, which opposes a hidden program. The mixed state represents a leadership that perceives benefit to both programs. The hidden state represents leadership preference for the covert program with support given to the overt program only to provide cover for the covert effort. |

A first observation is that there is no single variable representing an "overall level of funding," nor is one necessary, since the overall level is the sum of the overt and hidden levels of funding, and since funding is handled easily in the master equation morphological analysis (see below). The absence of a single, overall level of funding as a variable simplified the morphological analysis. The two subdivisions capture the total, thus including an "overall level of funding" variable would be redundant.

In the morphological analysis model the leadership-pathway information is represented at the coarsest level. One advantage of this is that there is no ambiguity about what is observable and what is not. The only observable in the system is Overt Funding Level—all other variables are not observable. Note that this does not mean that probes cannot be developed to influence these variables—leadership could be enticed to take a more "hawkish" or "dovish" stance or the organization's overall funding level could be modified without knowing any covert information.

Figure 10:
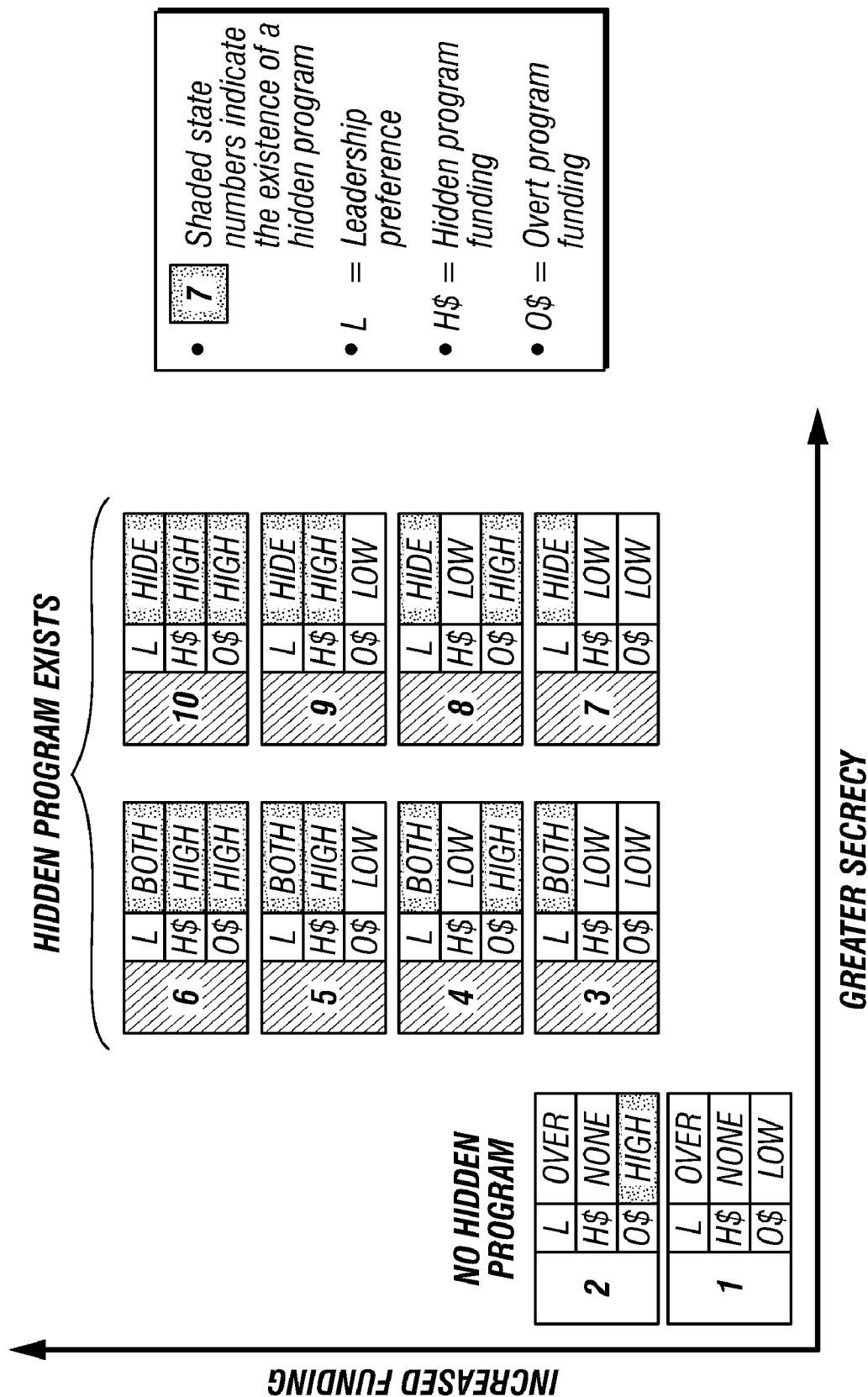
FIG. 10 shows revised allowable state transitions developed according to the invention.

Using the above variables, we constructed the morphological analysis constraint matrix shown in FIG. 10, below, and identified constraints. As before, the constraints are coded by letters which correspond to cells in the table in FIG. 8.

The states allowed given these constraints are given in Table 11, below:

TABLE 11

Allowed States in Leadership-Pathway Model

| | Allowable States | | | |
|---|---|---|---|---|
| | Variable | | | |
| State | Hidden Program | Leadership Mix | Hidden Funding | Overt Funding |
| 1 | NONE | OVERT | NONE | LOW |
| 2 | NONE | OVERT | NONE | HIGH |
| 3 | EXISTS | BOTH | LOW | LOW |
| 4 | EXISTS | BOTH | LOW | HIGH |
| 5 | EXISTS | BOTH | HIGH | LOW |
| 6 | EXISTS | BOTH | HIGH | HIGH |
| 7 | EXISTS | HIDDEN | LOW | LOW |
| 8 | EXISTS | HIDDEN | LOW | HIGH |
| 9 | EXISTS | HIDDEN | HIGH | LOW |
| 10 | EXISTS | HIDDEN | HIGH | HIGH |

This morphological analysis identifies ten allowed states out of a possible 36 total. As in the first morphological analysis, each of the constraints provides a validation criterion which can be triangulated against the full model; however, the new morphological analysis juxtaposes the preference structure of the leadership cell against levels of effort within the pathway model. A natural depth extension to the approach would be to combine the two morphological analysis models into a more refined joint pathway-leadership model. Observe that unlike the first model's results, most of the states in this second model involve a hidden program, and there are only two states which involve no covert activity. This is consistent with the analytical goals, which are focused on determining the status of the covert activity and using observable properties of a system of interest to discern its hidden properties. Observe that states that have a hidden program have a richer structure, and the analysis makes the unsurprising observation that if leadership is mixed, then all funding allocations are allowed, while if leadership is biased towards the covert program, then only those allocations favoring covert activity are allowed. This argument has generated some controversy—a competing argument is that it may be dangerously misleading to assert that a bias toward the covert implies that covert funding must be equal to or greater than overt funding levels. There may well be other factors at stake. An appropriate way to address this controversy would be to compare to the example target simulation system and to evidence from real-world systems. Such comparisons would go far to determine what exactly is or is not "allowed".

One important observation is that state 8 has higher funding for the overt program while the leadership preference is for the hidden program. One approach is to disallow this state, since this funding pattern is inconsistent with the leadership preference. This is an example of a 3-variable constraint, which is not revealed by the morphological analysis matrix approach, which only identifies pair-wise constraints. As previously mentioned, this step is controversial, and a future effort should to triangulate against other formulations, such as the full example target simulation system. This would help determine whether state 8 is important for the analysis or not. This confusion actually helps validate the approach, since it is an example where the breadth-level analysis surfaces differences in expert opinion that can be investigated in more depth through other means.

Despite its improvement in utility, the leadership-pathway morphological analysis still makes no statements about the response of the system to external probes. For this, one can go beyond basic morphological analysis into the dynamic reasoning of the master equation morphological analysis approach.

It is preferred to capture the dynamic as well as the static system information. In fact, as has been noted earlier, it is necessary to do so in order to understand the system's behavior correctly. In the morphological analysis framework, this information is framed in terms of which states are reachable from a given initial state. For the example target simulation problem, one is interested in the dynamics of system responses to deliberate state perturbations, known as probes. This actually makes the analysis easier, since one is interested only in the system's response to specific external stimuli. The first key assumption in the master equation morphological analysis is the morphological breakdown of these stimuli. Based on discussions with subject matter experts, it was decided to consider probes of leadership and probes of the overall level of resources.

Leadership Probes: —These probes cause shifts in the preferences of the leadership. "Leadership" in this context denotes a collection of decision-makers, each with a preference for how available resources should be allocated to overt and hidden pathways. Collectively, the leadership makes a decision, which we assume to be non-observable, about which pathway takes priority. No knowledge of the overall preference of the leadership will be assumed. However, it is assumed that means for influencing their makeup is available, for example, by changing the perceived level of risk associated with pursuing the hidden pathway, or by removing a known "hawk" or "dove" from the decision process. The general form of a leadership probe can then take one of three forms:

1. Shift in preference towards hidden programs
2. No Shift
3. Shift in preference towards overt programs Funding Probes—These probes cause shifts in the overall level of funding. These shifts simply reflect the availability of funding, with no assumptions about how these funds will be allocated, re-allocated, or de-allocated. Increases or decreases in funding will lead to increases or decreases in the level of effort of either or both of the overt and hidden programs. The decision-makers' (leadership's) preferences determine which programs will be increased or cut. At a breadth level, the effects of funding probes can take one of three forms:

1. Increase in overall level of funding
2. No change in funding
3. Decrease in overall level of funding.

At this breadth level, we have a total of nine probes available; these represent all combinations of funding and leadership probes, as shown in the following table of allowable probes:

TABLE 12

Transition Types

| Probe | Funding | Leadership |
|---|---|---|
| 1 | Increase | Overt preferred |
| 2 | Increase | No change |
| 3 | Increase | Hidden preferred |
| 4 | No change | Overt preferred |
| 5 | No change | No change |
| 6 | No change | Hidden preferred |
| 7 | Decrease | Overt preferred |
| 8 | Decrease | No change |
| 9 | Decrease | Hidden preferred |

Note that probe 5 is the null probe - there is no stimulus, and hence one assumes that there is no response from the system.

In order to systematically analyze the system response to each probe by using master equation morphological analysis, for each of the possible configurations of the system one tabulates the possible transitions available to the system. In enumerating the allowed system transitions, some basic rules must be followed:

1. A system state transition is defined as occurring when a single system variable is changed by one step, with the following two exceptions:
   a. Increasing covert program funding from NONE to Low requires a concomitant change in leadership attitude from OVERT to BOTH, and vice versa.

b. Funding can be shifted between programs even though there is no change in the overall level of funding. This will seem to be two vice one funding change, but actually involves only a single change (e.g., the change between states 4 and 5).

c. For the purposes of transition, if funding can be reprogrammed between Overt and Hidden programs, then 2. A system state transition may occur in either direction, up or down.

Applying these basic rules to the transitions shown in Table 9, one gets the allowed state transitions shown in Table 13, below. To avoid duplication, only the changes to a higher numbered state are listed, as each state transition is bidirectional.

TABLE 13

Allowed State Transitions in Leadership-Pathway Model

| | Allowable States | | | | |
|---|---|---|---|---|---|
| | Variable | | | | |
| State | Hidden Program | Leadership Mix | Hidden Funding | Overt Funding | Allowable Transitions |
| 1 | NONE | OVERT | NONE | LOW | 2, 3 |
| 2 | NONE | OVERT | NONE | HIGH | 3 |
| 3 | EXISTS | BOTH | LOW | LOW | 4, 5, 7 |
| 4 | EXISTS | BOTH | LOW | HIGH | 5, 6, 8 |
| 5 | EXISTS | BOTH | HIGH | LOW | 6, 9 |
| 6 | EXISTS | BOTH | HIGH | HIGH | 10 |
| 7 | EXISTS | HIDDEN | LOW | LOW | 8, 9 |
| 8 | EXISTS | HIDDEN | LOW | HIGH | 10 |
| 9 | EXISTS | HIDDEN | HIGH | LOW | 10 |
| 10 | EXISTS | HIDDEN | HIGH | HIGH | NONE |

State 8 is included, but note the caveats listed above. Although State 8 is listed as an allowable transition for State 7, State 8 is internally inconsistent and thus really can only be a transitory state. State 8 indicates a preference for hidden funding but with the overt program being preferentially funded. Given that, State 8, if reached, automatically would default to State 9. Thus State 8 is an unlikely starting or ending point, but is included as a necessary intermediate state for transitions to be considered.

Figure 9:
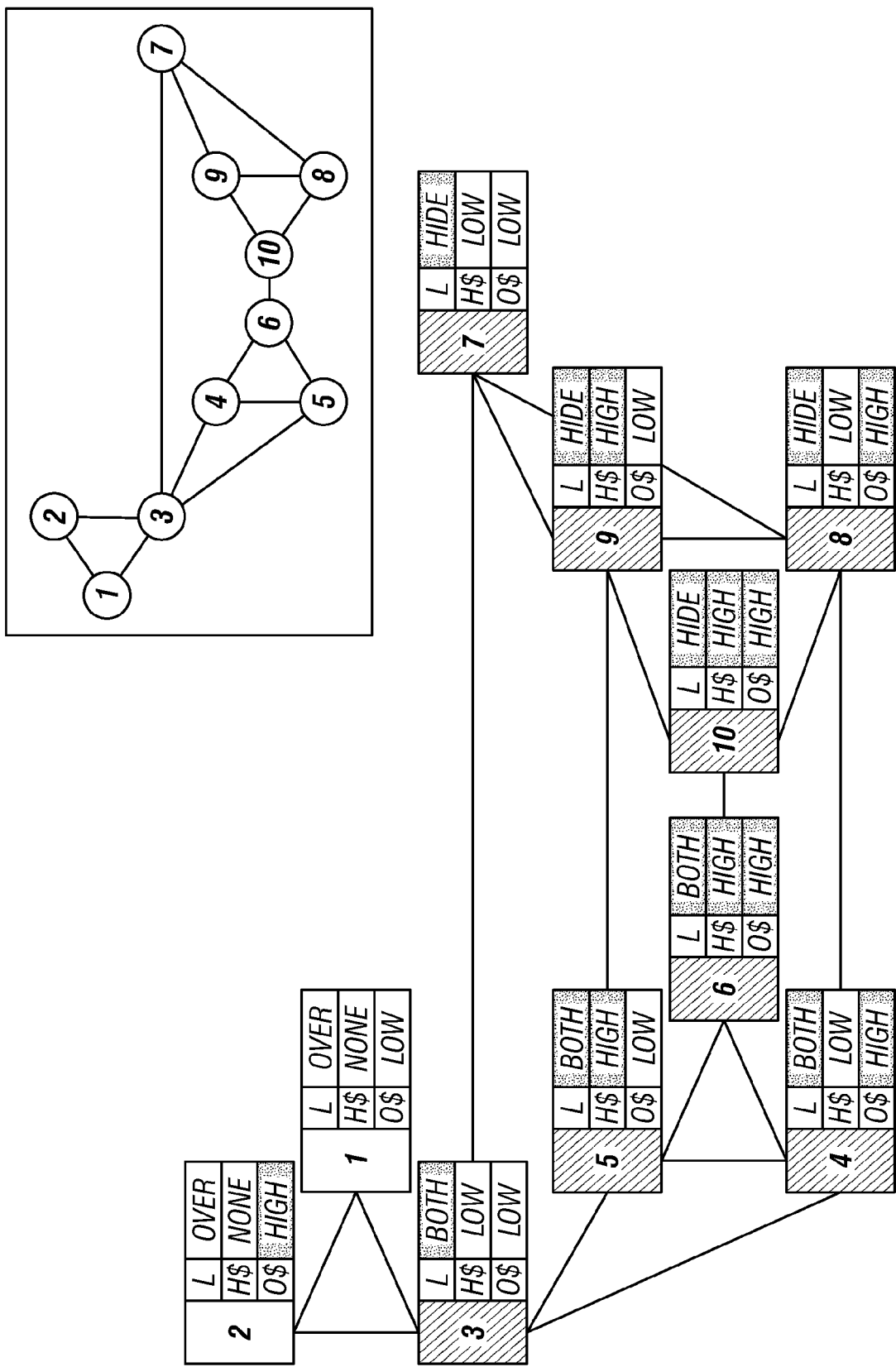
FIG. 9 shows allowable state transitions developed according to the invention.

These transitions also can be shown graphically, as in FIG. 9. In this diagram:

The state numbers correspond to those in Tables 4 and 6, above

The following abbreviations are used:)

L—Leadership mix)

H$—Hidden program funding)

O$—Overt program funding

The color-coding (gray scales) and labeling for each state match those in Tables 4 and 6, above.

The graphical representation shows symmetry between States 4, 5, and 6 and States 8, 9, and 10. A similar symmetry would exist between States 3, 4, and 5 and States 7, 8, and 9. The overall symmetry is shown more clearly in the smaller diagram at the upper right-hand side of FIG. 9. In the smaller diagram, only the numbered states are represented, without any internal details.

This symmetry is key, as it ensures that for any two-step probe (any probe which affects two variables), the same end state is reached regardless of which change is applied first. For instance, starting in State 4, if funding is increased and leadership preference for overt programs (secrecy) is increased, the same end result is reached either by:

1. Applying the funding increase first (transitioning from State 4 to State 6) and then the leadership preference (transitioning from State 6 to State 10), or 2. Applying the leadership preference first (transitioning from State 4 to State 8) and then the funding increase (transitioning from State 8 to State 10).

This is indicative of the current lack of temporal resolution in the morphological analysis technique that was noted earlier. Further research would be required to better understand how to incorporate the time factor and sequencing into this technique.

For each of the nine probes shown in Table 5, above, consider each of the nine allowed starting states (State 8 being omitted) and analyze which final states are allowed. For example, probes that involve a funding decrease will result in final states that have lower overall levels of funding than the initial states. One represents these allowed transitions in tabular form below. Much of the argumentation justifying allowed and disallowed transitions are shared. Use the following notation as shorthand for the arguments used for each transition. These arguments will be noted in the comment field for each transition:

Comments for Probe Tables

A. Overt leadership shift has no impact since leadership already has strong overt preference.

B. Funding increase will appear in the overt program due to overt leadership preference.

C. Funding increase can appear in either or both programs due to leadership preference for both programs.

D. Funding will increase in whichever program is not maximally funded, due to leadership preference for both programs.

E. Funding will preferentially increase in hidden program, due to leadership preference for hidden program. If hidden program is maximally funded, funding will increase in overt program.

F. No effect from probe.

G. No funding effect from probe.

H. Funding will be allocated over both programs since leadership has preference for both.

I. Funding decrease will appear in hidden program, due to leadership preference for overt program.

J. Funding will decrease in whatever program is not maximally funded, due to leadership preference for both programs.

K. Hidden preference shift has no effect, since leadership already has strong hidden preference.

L. Funding can decrease in either program, since leadership has preference for both.

M. Funding will decrease in overt program, since leadership has preference for hidden program.

N. Funding will decrease in hidden program, since overt program is required, despite leadership preference for hidden program Probe 1: Funding Increase, Overt Preference Shift

| INITIAL STATE | FUNDING INCREASE OVERT PREFERENCE SHIFT | |
|---|---|---|
| | ALLOWED FINAL STATES | COMMENTS |
| 1 | 2 | A |
| 2 | 2 | Funding not taken |
| 3 | 2 | Funding not taken<br>Hidden program dismantled |
| 4 | 2 | |
| 5 | 2 | |
| 6 | 2 | |
| 7 | 4 | B |
| 9 | 6 | B |
| 10 | 6 | Funding not taken |

N.B.: State 8 not a likely starting state, and thus has been omitted

This probe includes both an increase in funding and a shift towards the overt program. This probe immediately illustrates a shortcoming of the master equation morphological analysis—the preference shift could lead to leadership no longer supporting, and hence removing funding for the hidden program. This would be inconsistent with an additional funding increase. One can call these situations "non-modeled behavior" and prescribe a more in-depth analysis to understand these circumstances. One can speculate on possible outcomes in these non-modeled situations. For example, one can posit that an existing covert program would be dismantled if leadership no longer supported it. Further conjectures include available funding not being obligated, or a new effort having nothing to do with the assumed overt and covert programs being undertaken.

Other transitions that are consistent with probe 1 all involve leadership shifts towards the overt program, and overall funding increases consistent with this preference (i.e., the overt program will receive a funding increase before the hidden one).

Note that in the table for Probe 1, continuing to apply the same probe logically results in an end state of State 2. All states shift to State 2 except for States 7, 9, and 10, which shift to States 4, 6, and 6, respectively. However, States 4 and 6 shift to State 2 under this probe. This means that the expected end state of continuing to apply this probe is State 2. This makes sense, as State 2 is the highest funding for a completely overt situation. This same logic may be applied to the remaining probe transition tables.

Probe 2: Funding Increase, No Preference Shift

| INITIAL STATE | FUNDING INCREASE NO PREFERENCE SHIFT | | COMMENTS |
|---|---|---|---|
| | ALLOWED FINAL STATES | | |
| | No Preference Shift | Preference Shift | |
| 1 | 2 | 3 | B |
| 2 | 2 | 4 | Funding not taken<br>New effort started |
| 3 | 4, 5 | 9, 10 | C |
| 4 | 6 | 10 | D |
| 5 | 6 | 10 | D |
| 6 | | | Funding not taken |
| 7 | 9 | 4, 5 | E |
| 9 | 10 | 6 | E |
| 10 | | | Funding not taken |

N.B.: State 8 not a likely starting state, and thus has been omitted

This probe provides increased funding, with no influence on the leadership. However, the additional available funding may well have an influence on leadership decision-making even if the probe did not. This gives rise to two possible sets of responses—one in which there is no shift in leadership preferences, and another in which the increased funding results in a shift in leadership preferences (i.e., more available money provides more opportunities for covert activity). Thus in this case, there is generally wider latitude in the number and types of allowed transitions.

Probe 3: Funding Increase, Hidden Preference Shift

| INITIAL STATE | FUNDING INCREASE HIDDEN PREFERENCE SHIFT | |
|---|---|---|
| | ALLOWED FINAL STATES | COMMENTS |
| 1 | 3 | E |
| 2 | 4,5 | D, E |
| 3 | 9 | E |
| 4 | 10 | E |
| 5 | 10 | E |
| 6 | 10 | Funding not taken |
| 7 | 9 | E |
| 9 | 10 | E |
| 10 | 10 | Funding not taken |

N.B.: State 8 not a likely starting state, and thus has been omitted

This probe provides increased funding, with a preference shift towards the covert program. While this probe entails wider latitude in the allowed transitions along the way, the logical end state if this probe were to be repeated several times would be State 10—maximal funding with a maximal preference for hidden programs.

Probe 4: No Funding Change, Overt Preference Shift

| INITIAL STATE | NO FUNDING CHANGE OVERT PREFERENCE SHIFT | |
|---|---|---|
| | ALLOWED FINAL STATES | COMMENTS |
| 1 | 1 | F |
| 2 | 2 | F |
| 3 | 1, 2 | See narrative |
| 4 | 2 | Excess funding available |
| 5 | 4 | Overt program preferentially funded |
| 6 | 6 | |
| 7 | 3 | G |
| 9 | 5 | G |
| 10 | 6 | G |

N.B.: State 8 not a likely starting state, and thus has been omitted

This probe consists of influencing leadership towards the overt program and no induced changes on the level of funding. Because there is no funding change to support the preference shift, this probe is fairly restricted in the allowed transitions, unlike probes 2 and 3. Still, continuing to apply this probe results in a net shift toward State 1, if hidden funding cannot be transferred to overt programs, or to State 2 if the hidden funding can be redirected.

State 6 is difficult to transition from, but could jump to State 2.

Probe 5: No Funding Change, No Preference Shift
NO FUNDING CHANGE
NO PREFERENCE SHIFT

| INITIAL STATE | ALLOWED FINAL STATES | COMMENTS |
|---|---|---|
| 1 | 1 | Included for completeness |
| 2 | 2 | |
| 3 | 3 | |
| 4 | 4 | |
| 5 | 5 | |
| 6 | 6 | |
| 7 | 7 | |
| 9 | 9 | |
| 10 | 10 | |

N.B.: State 8 not a likely starting state, and thus has been omitted

This is the "null probe" or "do nothing" probe. We assume the system will continue in its current state. The transition table for this probe simply takes every state into itself.

Probe 6: No Funding Change, Hidden Preference Shift

| INITIAL STATE | NO FUNDING CHANGE HIDDEN PREFERENCE SHIFT | |
|---|---|---|
| | ALLOWED FINAL STATES | COMMENTS |
| 1 | 1 | Hidden preferred, but no funding |
| 2 | 3 | H |
| 3 | 7 | G |
| 4 | 5, 9 | E |
| 5 | 9 | E, G |
| 6 | 10 | G |
| 7 | 7 | K |
| 9 | 9 | K |
| 10 | 10 | K |

N.B.: State 8 not a likely starting state, and thus has been omitted

This probe consists of shifting leadership's preference towards the hidden program. Like probe 4, this probe is also fairly limited in its allowed transitions because of the lack of accompanying funding changes. Lack of funding prevents any transition from State 1, regardless of the leadership preferences, and hence this is unmodeled behavior. A shift in preference toward the hidden would have to entail increased funding for the covert program in order to have any effect. Note that State 4 could go to State 8 in a single transition, but State 8 is internally inconsistent and thus defaults automatically to State 9.

Probe 7: Funding Decrease, Overt Preference Shift

| INITIAL STATE | FUNDING DECREASE OVERT PREFERENCE SHIFT | |
|---|---|---|
| | ALLOWED FINAL STATES | COMMENTS |
| 1 | 1 | Cease all programs |
| 2 | 1 | A |
| 3 | 1 | I |
| 4 | 2 | I |
| 5 | 2 | I |
| 6 | 2 | I |
| 7 | 1, 2 | See narrative |
| 9 | 4 | I, J |
| 10 | 4 | I, J, L |

N.B.: State 8 not a likely starting state, and thus has been omitted

This probe in general leads to a dismantling of the hidden program—the combined actions of the preference shift and the funding cut lead to final states without hidden funding (States 1 and 2) being highly favored. The state to which State 7 transitions depends upon whether or not hidden funding can be reprogrammed to overt projects. If it can, the resultant state is State 2. Otherwise it is State 1. Continued funding decreases lead to State 1.

Probe 8: Funding Decrease, No Preference Shift

| INITIAL STATE | FUNDING DECREASE NO PREFERENCE SHIFT | |
|---|---|---|
| | ALLOWED FINAL STATES | COMMENTS |
| 1 | 1 | Cease all programs |
| 2 | 1 | A |
| 3 | 1 | Cease hidden programs |
| 4 | 3 | J |
| 5 | 3 | J |
| 6 | 4, 5 | J |
| 7 | 1 | Cease hidden programs |
| 9 | 7 | J, N |
| 10 | 8, 9 | M |

N.B.: State 8 not a likely starting state, and thus has been omitted

This probe is a generic funding cut, with no leadership influence. Since there is no leadership preference shift, each transition shown above remains within its own leadership preference (OVERT, BOTH, HIDDEN). However, note that continued funding decreases could influence leadership to shift preference out of necessity, and thus both State 3 and State 7 shift to State 1 as the only possible means of further reducing funding.

Probe 9: Funding Decrease, Hidden Preference Shift

| INITIAL STATE | FUNDING DECREASE HIDDEN PREFERENCE SHIFT | |
|---|---|---|
| | ALLOWED FINAL STATES | COMMENTS |
| 1 | 1 | Cease all programs |
| 2 | 1 | Hidden preferred, but no funding |
| 3 | 1 | Cease hidden programs |
| 4 | 7 | M |
| 5 | 7 | M |
| 6 | 9 | M |
| 7 | 1 | Cease hidden programs |
| 9 | 7 | N |
| 10 | 9 | M |

N.B.: State 8 not a likely starting state, and thus has been omitted

This probe preferentially results in State 7 if applied repeatedly, as State 7 is the state with the strongest hidden preference and the least funding. State 1 cannot shift as there is no funding available to do so. In fact decreasing funding from State 1, which is the lowest possible funding state, would result in cessation of all activity. However, note that continued funding decreases could influence leadership to shift preference to OVERT out of necessity, and thus State 7 would have to shift to State 1 as the only possible means of further reducing funding.

TABLE 14

Probe Results Summary
PROBE RESULTS SUMMARY

| PROBE | EXPECTED FINAL STATES | COMMENTS |
|---|---|---|
| 1 | 2 | Maximal funding, overt |
| 2 | 2, 6, 10 | Maximal funding |
| 3 | 10 | Maximal funding, hidden |
| 4 | 1, 2 | Overt only |
| 5 | No | No change |
| 6 | 7, 9, 10 | Same funding, hidden |
| 7 | 1 | Minimal funding, overt |
| 8 | 1, 7 | Minimal funding |
| 9 | 7 | Minimal funding, hidden |

Looking at the tabular probe results shown above and considering the probes as having been applied repeatedly (i.e., not stopping after a single transition has occurred) yields Table 14. This is entirely expected, but serves as a cross-check of the morphological analysis methodology.

To illustrate how this analysis is of operational use, we present an example of how this master equation morphological analysis framework can be used to assess probe efficacy. To illustrate the process, one will use in FIG. 10 the same conventions used in FIG. 9.

Figure 11:
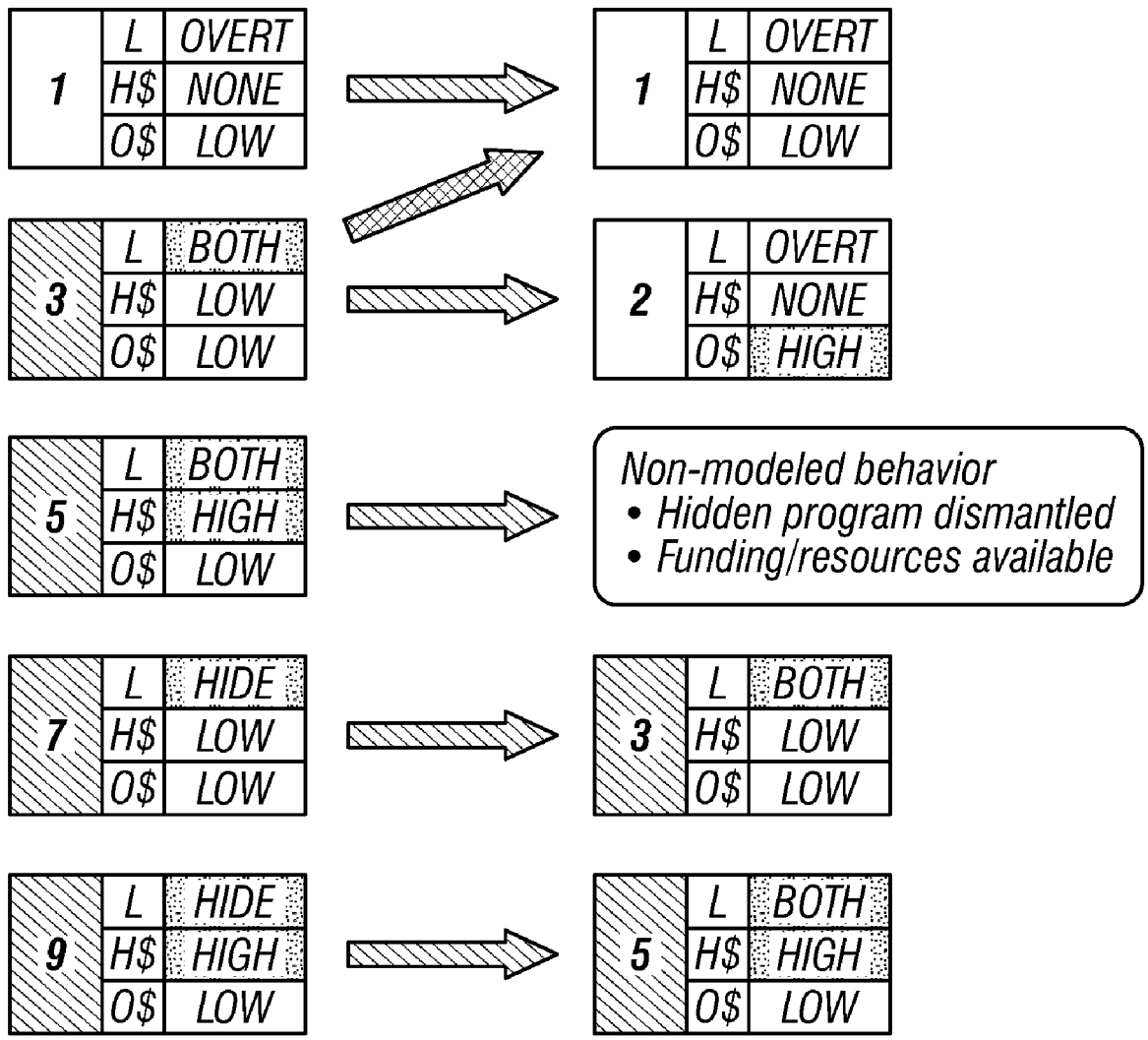
FIG. 11 shows graphically the developed state representations.

The goal of the example target simulation system is to use a combination of observations and probes to assess the state of the system. Consider an example of how the master equation morphological analysis framework can assist in the observe/probe cycle to clarify the predicted impacts of probes. First observe the state of the system. By assumption, the only part of the system that is observable is the funding state of the overt program. Prior to observation, assume the system can be in any one of the nine possible states. Assume that one observes that the overt program funding is in the LOW state. This reduces the possible states to 5: State 1, 3, 5, 7, and 9. Then use the probe transition tables to assess the likely final states after a probe. Assume due to these and other factors (e.g., feasibility, predicted side-effects), that probe 4 is selected. Enumerate the possible transitions for our allowed states. This is depicted in FIG. 11.

If one follows this probe with another round of observation, the system will either be in the LOW or HIGH overt funding state, or in some other state due to the non-modeled behavior. A more in-depth modeling exercise must be conducted—for example, by using the full example target simulation system—to determine whether the non-modeled behavior would yield an observable signature. If it were, and it were not observed, then an observation of LOW overt activity would imply the system was in states 1 or 3 and an observation of HIGH overt activity would imply that the system now is in state 2 or 4. Note, however, that the transition from State 3 depends upon the question of whether or not the LOW hidden funding level can be reprogrammed to supplement the overt funding. If it can, State 3 transitions to State 2. Otherwise it transitions to State 1.

Now the uncertainty in the results can be addressed and possibly resolved by subsequent observation-probe cycles, again supported by the master equation morphological analysis transition table. The master equation morphological analysis approach predicts that the initial uncertainty on the state of the system will be reduced by an appropriately selected observation-probe cycle.

Like the morphological analysis on which it based, the master equation morphological analysis is only analysis—it provides a set of theoretical predictions of possibilities which may or may not be valid. The best way to test the prediction of a theory is to conduct experiments, following the scientific method. Unfortunately, the example target simulation problem like many problems in complexity and social science, is not one that is readily amenable to experiment. Social scientists have addressed this problem by observing that the heart of the scientific method is comparison—scientific approaches compare theoretical predictions to the results of real world experiments.

In social sciences, an important approach to validation is triangulation, in which the predictions of two separate theoretical approaches are compared to one another. As in the scientific method, predictions mutually confirmed by both approaches are more likely to be correct than predictions made be either method alone (the error rate of the triangulated predictions is proportional to product of the error rates of the component methods). It has already been mentioned how a breadth-depth multi-methodology can be the basis of validation strategy, by comparing the predictions of breadth to depth methods. For the example target simulation problem, one has at one's disposal the example target simulation system, which makes in-depth predictions about the behavior of the example target simulation system problem. One can triangulate a small subset of the transitions predicted by the master equation morphological analysis approach. Specifically, the invention allows for testing of predictions of the transition behavior of state 7 under probe 1 and the transitions of states 3, 4, and 7 under probe 4. The behavior of the example target simulation system agreed for all of the probe 4 test cases. The state 7 transition under probe 1 disagreed with the example target simulation system. This is likely due to shortcomings in the example target simulation, and not in the master equation morphological analysis. Whether the error lies in the master equation morphological analysis, the example target simulation system, or both, the triangulation has provided a useful method for validating the analysis of the example target simulation problem.

Research for the example target simulation program has led to a taxonomy of methodological approaches called Breadth-Depth. Based on this taxonomy, the invention provides a multi-methodology based on the initial application of low-complexity Breadth methods prior to the application of high-complexity Depth methods. In support of example target simulation, the invention provides a breadth analysis of the example target simulation problem. The analysis has relied on the technique of Morphological Analysis. The invention employs the novel technique of master equation morphological analysis (master equation morphological analysis) to study the dynamics of a system over a state space that has been segmented by a morphological analysis. The work demonstrates that breadth analysis is useful for structuring the application of depth methods and that breadth approaches provide high-level guidance that is accessible to analytic and operational users. A validation approach is further provided, breadth-depth triangulation, in which the results of the breadth method are compared to those of the depth method. The triangulation increases the confidence of predictions produced by both the breadth master equation morphological analysis and the depth example target simulation system analysis. Moreover, the triangulation helps highlight areas where the analysis of both approaches is lacking.

In the preferred embodiment, and as readily understood by one of ordinary skill in the art, the apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of validating a computer model of a complex system, the method comprising the steps of:
   eliciting information regarding the complex system from one or more human experts;
   determining from the elicited information a set of variables and a set of constraints on those variables regarding the complex system;
   automatically by computer examining output of the computer model to locate violations of determined constraints; and
   generating output establishing any located violations; and
   wherein the eliciting and determining step comprise a master equation morphological analysis of the complex system.

2. The method of claim 1 wherein violations of determined constraints comprise disallowed transitions between allowed states.

3. The method of claim 1 wherein the eliciting and determining steps comprise eliciting directional causal relations between variables.

4. The method of claim 3 wherein the determining step comprises generating a family at testable hypotheses consisting of all possible causal graphs based on linkage information provided by the morphological analysis.

5. The method of claim 1 wherein the examining step comprises determining if states exist that are unobserved in the output of the computer model.

6. A non-transitory computer-readable medium comprising computer software for validating a computer model of a complex system, after elicitation of information regarding the complex system from one or more human experts, the computer software comprising;
   code receiving a set of variables and a set of constraints on those variables regarding the complex system determined from the elicited information;
   code examining output of the computer model to locate violations of determined constraints; and
   code generating output establishing any located violations; and wherein said receiving code comprises code receiving a master equation morphological analysis of the complex system.

7. The computer-readable medium of claim 6 wherein in said examining code violations of determined constraints comprise disallowed transitions between allowed states.

8. The computer-readable medium of claim 6 wherein said receiving code comprises code receiving directional causal relations between variables.

9. The computer-readable medium of claim 8 wherein said receiving code comprises code receiving a family of testable hypotheses consisting of all possible causal graphs based on linkage information provided by the morphological analysis.

10. The computer-readable medium of claim 6 wherein said examining code comprises code determining if states exist that are unobserved in the output of the computer model.

11. An apparatus for validating a computer model of a complex system, after elicitation of information regarding the complex system from one or more human experts, said apparatus comprising:
   computer means for receiving a set of variables and a set of constraints on those variables regarding the complex system determined from the elicited information;
   computer means for examining output of the computer model to locate violations of determined constraints; and
   computer means for generating output establishing any located violations; and
   wherein said receiving means comprises means for receiving a master equation morphological analysis of the complex system.

12. The apparatus of claim 11 wherein in said examining means violations of determined constraints comprise disallowed transitions between allowed states.

13. The apparatus of claim 11 wherein said receiving means comprises means for receiving directional causal relations between variables.

14. The apparatus of claim 13 wherein said receiving means comprises means for receiving a family of testable hypotheses consisting of ail possible causal graphs based on linkage information provided by the morphological analysis.

15. The apparatus of claim 11 wherein said examining means comprises means for determining if states exist that are unobserved in the output of the computer model.

* * * * *